(12) United States Patent
Haynes

(10) Patent No.: US 11,702,840 B2
(45) Date of Patent: Jul. 18, 2023

(54) ROOFING, CLADDING OR SIDING MODULE, ITS MANUFACTURE AND USE

(71) Applicant: Zinniatek Limited, Auckland (NZ)

(72) Inventor: Andrew Leo Haynes, Auckland (NZ)

(73) Assignee: ZINNIATEK LIMITED, Auckland (NZ)

( * ) Notice: Subject to any disclaimer, the term of this patent is extended or adjusted under 35 U.S.C. 154(b) by 70 days.

(21) Appl. No.: 16/693,719

(22) Filed: Nov. 25, 2019

(65) Prior Publication Data

US 2020/0199874 A1 Jun. 25, 2020

Related U.S. Application Data

(60) Provisional application No. 62/781,782, filed on Dec. 19, 2018.

(51) Int. Cl.
*E04D 1/34* (2006.01)

(52) U.S. Cl.
CPC ........ *E04D 1/34* (2013.01); *E04D 2001/3435* (2013.01)

(58) Field of Classification Search
CPC ....... H02S 20/25; F24S 2020/13; F24S 20/67; F24S 20/69; E04D 2001/3435; E04D 2001/3494; E04D 2001/3455; E04D 1/34; E04D 1/26
See application file for complete search history.

(56) References Cited

U.S. PATENT DOCUMENTS

| | | |
|---|---|---|
| 167,833 A | 9/1875 | Garland |
| 510,027 A | 12/1893 | Johnson |
| 1,004,338 A | 9/1911 | Austin |
| 1,266,137 A | 5/1918 | Melde |
| 1,634,126 A | 6/1927 | Tyra |

(Continued)

FOREIGN PATENT DOCUMENTS

| | | |
|---|---|---|
| CA | 2849258 A1 | 3/2013 |
| CA | 2794345 A1 | 5/2013 |

(Continued)

OTHER PUBLICATIONS

ASTM D3462, Standard Specification for Asphalt Shingles Made from Glass Felt and Surfaced with Mineral Granules, downloaded Aug. 26, 2018, 4 pps.

(Continued)

*Primary Examiner* — Jessica L Laux
(74) *Attorney, Agent, or Firm* — Foley & Lardner LLP

(57) ABSTRACT

A roofing, cladding or siding product which is light weight, easy to install, durable and resistant to environmental wear. The module comprises an underlapping region and an exposed region, wherein the underlapping region is adapted to be at least partially covered by the exposed region of an adjacent module when installed on a building surface. The module also includes a textured surface area on an upper surface of the underlapping region and/or an underside of the exposed region. In use, the textured surface (e.g. made up from a densely packed group of cones, pyramids or cylinders) presents an increased surface area for improved contact with an adhesive. The adhesive, e.g. in strip form, may by located on an aligning part of an adjacent module with the textured surface area.

25 Claims, 6 Drawing Sheets

(56) References Cited

U.S. PATENT DOCUMENTS

| | | | |
|---|---|---|---|
| 1,678,333 A | 7/1928 | Figge |
| 1,741,515 A | 12/1929 | Halprin |
| 1,941,216 A | 12/1933 | McKeown |
| 2,149,818 A | 3/1939 | North |
| 2,260,446 A | 11/1941 | Ormsby |
| 2,362,236 A | 11/1944 | Bassler |
| 2,568,603 A | 9/1951 | Johnb |
| 2,624,298 A | 1/1953 | Farren |
| 2,680,565 A | 6/1954 | Lof |
| 2,756,699 A | 7/1956 | Lockwood |
| 2,766,861 A | 10/1956 | Abramson |
| 3,058,265 A | 10/1962 | Lapsensohn |
| 3,223,018 A | 12/1965 | Tucker |
| 3,332,830 A | 7/1967 | Tomlinson |
| 3,357,064 A | 12/1967 | Munse |
| 3,661,410 A | 5/1972 | Larson et al. |
| 4,141,182 A | 2/1979 | McMullen |
| 4,173,243 A | 11/1979 | Wilde et al. |
| 4,173,253 A | 11/1979 | Wiegand |
| 4,201,196 A | 5/1980 | Zani |
| 4,281,639 A | 8/1981 | Kuronen |
| 4,288,959 A | 9/1981 | Murdock |
| 4,319,437 A | 3/1982 | Murphy |
| 4,411,117 A | 10/1983 | Bolha |
| 4,426,823 A | 1/1984 | Kobe |
| 4,712,351 A | 12/1987 | Kasprzak |
| 4,956,140 A | 9/1990 | Rolles et al. |
| 5,053,180 A | 10/1991 | Wang et al. |
| 5,070,671 A | 12/1991 | Fifield et al. |
| 5,076,037 A | 12/1991 | Crick et al. |
| 5,094,058 A | 3/1992 | Slocum |
| 5,100,274 A | 3/1992 | Hasan et al. |
| 5,104,770 A | 4/1992 | Usifer et al. |
| 5,295,339 A | 3/1994 | Manner |
| 5,347,785 A | 9/1994 | Terrenzio et al. |
| 5,437,735 A | 8/1995 | Younan et al. |
| 5,475,963 A | 12/1995 | Chelednik |
| 5,487,247 A | 1/1996 | Pigg |
| 5,615,523 A | 4/1997 | Wells et al. |
| 5,615,527 A | 4/1997 | Attley |
| 5,630,305 A | 5/1997 | Hlasnicek |
| 5,651,226 A | 7/1997 | Archibald |
| 5,690,876 A | 11/1997 | Gallo, Jr. |
| 5,711,126 A | 1/1998 | Wells |
| 6,021,611 A | 2/2000 | Wells et al. |
| 6,061,978 A | 5/2000 | Dinwoodie et al. |
| 6,145,264 A | 11/2000 | Dallaire |
| 6,164,034 A | 12/2000 | Roetheli et al. |
| 6,201,179 B1 | 3/2001 | Dalacu |
| 6,220,956 B1 | 4/2001 | Kilian et al. |
| 6,248,271 B1 | 6/2001 | Graham et al. |
| 6,856,496 B1 | 2/2005 | Mucci et al. |
| 6,908,295 B2 | 6/2005 | Thielman et al. |
| 6,941,706 B2 | 9/2005 | Austin et al. |
| 7,520,098 B1 | 4/2009 | Martinique et al. |
| 7,735,287 B2 | 6/2010 | Gaudreau |
| 8,020,353 B2 | 9/2011 | Gaudreau |
| 8,100,341 B1 | 1/2012 | Roderick et al. |
| 8,215,070 B2 | 7/2012 | Railkar et al. |
| 8,245,475 B1 | 8/2012 | Thomson et al. |
| 8,307,599 B2 | 11/2012 | Jenkins et al. |
| 8,333,356 B2 | 12/2012 | Ernst et al. |
| 8,402,707 B2 | 3/2013 | Mitchell et al. |
| 8,468,754 B2 | 6/2013 | Railkar et al. |
| 8,567,601 B2 | 10/2013 | Turek et al. |
| 8,713,860 B2 | 5/2014 | Railkar et al. |
| 8,713,882 B2 | 5/2014 | Kalkanoglu et al. |
| 8,763,339 B2 | 7/2014 | Bryson et al. |
| 8,782,967 B2 | 7/2014 | Daniels |
| 9,182,136 B2 | 11/2015 | Oaten et al. |
| 9,322,173 B2 | 4/2016 | Pisani |
| 9,416,540 B2 | 8/2016 | Allen et al. |
| 9,518,391 B2 * | 12/2016 | Haynes .............. H02S 40/44 |
| 11,011,912 B2 * | 5/2021 | Haynes .............. H02J 3/381 |
| 2001/0022055 A1 | 9/2001 | Zhang |
| 2002/0037630 A1 | 3/2002 | Agarwal et al. |
| 2002/0117166 A1 | 8/2002 | Okumura |
| 2003/0154667 A1 | 8/2003 | Dinwoodie |
| 2004/0009338 A1 | 1/2004 | Jo et al. |
| 2004/0020528 A1 | 2/2004 | Patwardhan |
| 2004/0074156 A1 | 4/2004 | Haynes |
| 2005/0026297 A1 | 2/2005 | Daniely et al. |
| 2005/0072091 A1 | 4/2005 | Morris |
| 2005/0072092 A1 | 4/2005 | Williams |
| 2005/0178429 A1 * | 8/2005 | McCaskill ............ E04D 1/26 136/251 |
| 2005/0202216 A1 * | 9/2005 | Rodrigues .............. E04D 1/26 428/194 |
| 2005/0239394 A1 | 10/2005 | O'Hagin et al. |
| 2005/0262797 A1 | 12/2005 | Davis |
| 2006/0026908 A1 * | 2/2006 | Gregori .............. E04D 1/2918 52/518 |
| 2006/0080942 A1 | 4/2006 | O'Neill |
| 2007/0039274 A1 | 2/2007 | Harrington et al. |
| 2007/0078191 A1 | 4/2007 | Guhde et al. |
| 2007/0119109 A1 | 5/2007 | Kuelker |
| 2007/0144096 A1 | 6/2007 | O'Neal |
| 2007/0193620 A1 | 8/2007 | Hines et al. |
| 2007/0266562 A1 | 11/2007 | Friedman et al. |
| 2008/0000174 A1 | 1/2008 | Flaherty et al. |
| 2008/0000512 A1 | 1/2008 | Flaherty et al. |
| 2008/0121270 A1 | 5/2008 | Mayer et al. |
| 2008/0184645 A1 | 8/2008 | Trabue et al. |
| 2008/0185748 A1 | 8/2008 | Kalkanoglu |
| 2008/0271773 A1 | 11/2008 | Jacobs et al. |
| 2008/0302030 A1 | 12/2008 | Stancel et al. |
| 2008/0302031 A1 | 12/2008 | Bressler et al. |
| 2009/0000222 A1 | 1/2009 | Kalkanoglu et al. |
| 2009/0215304 A1 | 8/2009 | Faust et al. |
| 2010/0037548 A1 | 2/2010 | Kalkanoglu et al. |
| 2010/0083602 A1 | 4/2010 | Pollack |
| 2010/0141042 A1 | 6/2010 | Kesler et al. |
| 2010/0170169 A1 | 7/2010 | Railkar et al. |
| 2010/0236162 A1 | 9/2010 | Tweedie |
| 2010/0237709 A1 | 9/2010 | Hall et al. |
| 2010/0313501 A1 | 12/2010 | Gangemi |
| 2011/0000535 A1 | 1/2011 | Davidson |
| 2011/0012430 A1 | 1/2011 | Cheng et al. |
| 2011/0017282 A1 | 1/2011 | Tas et al. |
| 2011/0037322 A1 | 2/2011 | Kanno |
| 2011/0041428 A1 | 2/2011 | Posnansky |
| 2011/0041518 A1 | 2/2011 | Peterson et al. |
| 2011/0047894 A1 | 3/2011 | Shadwell et al. |
| 2011/0214372 A1 | 9/2011 | Mullet et al. |
| 2011/0277408 A1 | 11/2011 | Turek et al. |
| 2012/0019074 A1 | 1/2012 | Frolov et al. |
| 2012/0024283 A1 | 2/2012 | Skillman |
| 2012/0098350 A1 | 4/2012 | Campanella et al. |
| 2012/0117908 A1 | 5/2012 | Turek et al. |
| 2012/0149291 A1 | 6/2012 | Roderick et al. |
| 2013/0095293 A1 | 4/2013 | Boss et al. |
| 2013/0167463 A1 | 7/2013 | Duve |
| 2013/0193769 A1 | 8/2013 | Mehta et al. |
| 2013/0233385 A1 | 9/2013 | Reese et al. |
| 2013/0255755 A1 | 10/2013 | Chich |
| 2013/0263534 A1 | 10/2013 | Railkar et al. |
| 2014/0090696 A1 | 4/2014 | Rodrigues et al. |
| 2014/0090697 A1 | 4/2014 | Rodrigues et al. |
| 2014/0190921 A1 | 7/2014 | Thomson et al. |
| 2014/0259998 A1 | 9/2014 | Railkar et al. |
| 2014/0259999 A1 | 9/2014 | Rodrigues et al. |
| 2014/0260001 A1 | 9/2014 | Kiik et al. |
| 2014/0265609 A1 | 9/2014 | Rodrigues et al. |
| 2015/0047285 A1 | 2/2015 | Dejarnette et al. |
| 2015/0089895 A1 * | 4/2015 | Leitch .............. E04D 1/29 52/518 |
| 2015/0240495 A1 | 8/2015 | Vermilion et al. |
| 2015/0354218 A1 * | 12/2015 | Houchin .............. B32B 27/08 52/518 |
| 2017/0059184 A1 | 3/2017 | Haynes et al. |
| 2017/0321423 A1 * | 11/2017 | Aschenbeck .............. E04D 1/29 |

(56) References Cited

U.S. PATENT DOCUMENTS

| | | | |
|---|---|---|---|
| 2017/0355392 A1 | 12/2017 | Nagatani et al. | |
| 2018/0123503 A1 | 5/2018 | Haynes et al. | |

FOREIGN PATENT DOCUMENTS

| | | |
|---|---|---|
| CN | 1261417 A | 7/2000 |
| DE | 46673 C | 8/1888 |
| DE | 20 02 738 A1 | 7/1971 |
| DE | 2002738 A1 | 7/1971 |
| DE | 42 16 171 A1 | 1/1993 |
| DE | 20 2005 002 105 | 6/2005 |
| DE | 10 2010 009 595 | 9/2011 |
| DE | 10 2010 019 815 A1 | 11/2011 |
| EP | 0 436 572 B1 | 11/1995 |
| EP | 2 009 704 | 12/2008 |
| EP | 2 075 389 A2 | 7/2009 |
| EP | 2 256 894 | 12/2010 |
| EP | 2 494 124 | 5/2014 |
| EP | 2 785 930 | 11/2015 |
| EP | 2 547 837 | 4/2017 |
| EP | 3 227 507 | 10/2017 |
| GB | 2 141 157 | 12/1984 |
| GB | 2 199 860 | 7/1988 |
| GB | 2 344 836 | 8/2002 |
| JP | S54-121515 | 9/1979 |
| JP | S6193750 | 5/1986 |
| JP | S61-169562 A | 7/1986 |
| JP | S63-065240 | 3/1988 |
| JP | S63-165633 | 7/1988 |
| JP | H534623 A | 2/1993 |
| JP | H06-108549 | 4/1994 |
| JP | 06-212742 A | 8/1994 |
| JP | H7217011 | 8/1995 |
| JP | H7218002 | 8/1995 |
| JP | 08-068566 A | 3/1996 |
| JP | 09-032141 A | 2/1997 |
| JP | H960981 | 3/1997 |
| JP | H972618 | 3/1997 |
| JP | H09-275644 A | 10/1997 |
| JP | H11-136540 | 2/1999 |
| JP | 11-0062317 A | 3/1999 |
| JP | 2001-295422 A | 10/2001 |
| JP | 2002-235955 | 8/2002 |
| JP | 2003-049509 | 2/2003 |
| JP | 2005-191578 A | 7/2005 |
| JP | 2006-022481 A | 1/2006 |
| JP | 2008-034557 A | 2/2008 |
| JP | 2008-180414 A | 8/2008 |
| JP | 2009-127921 | 6/2009 |
| JP | 2011-041464 A | 2/2011 |
| JP | 5118102 B2 | 1/2013 |
| JP | 2015-502726 | 1/2015 |
| JP | 60-060652 B2 | 1/2017 |
| JP | 2018-011504 | 1/2018 |
| KR | 20110128094 | 11/2011 |
| NZ | 733484 | 6/2019 |
| WO | WO-98/57009 | 12/1998 |
| WO | WO-00/23673 A1 | 4/2000 |
| WO | WO-02/093655 | 11/2002 |
| WO | WO-2006/063333 A2 | 6/2006 |
| WO | WO-2007/058548 | 5/2007 |
| WO | WO-2007/058549 | 5/2007 |
| WO | WO-2008/070907 A1 | 6/2008 |
| WO | WO-2008/137966 | 11/2008 |
| WO | WO-2010/036980 A1 | 4/2010 |
| WO | WO-2010/150316 | 12/2010 |
| WO | WO-2011/027627 A1 | 3/2011 |
| WO | WO-2011/099109 A1 | 8/2011 |
| WO | WO-2012/021145 | 2/2012 |
| WO | WO-2013/067484 A1 | 5/2013 |
| WO | WO-2013/081477 A1 | 6/2013 |
| WO | WO-2013/112248 | 8/2013 |
| WO | WO-2015/132756 A1 | 9/2015 |

OTHER PUBLICATIONS

Deck-ArmorTM Roof Protection (GAF Corp., Wayne, New Jersey), Updated Jul. 2018, 5 pps.

* cited by examiner

ROOFING, CLADDING OR SIDING MODULE, ITS MANUFACTURE AND USE

CROSS-REFERENCE TO RELATED APPLICATION

The present application claims the benefit of and priority to U.S. Provisional Patent Application No. 62/781,782, filed Dec. 19, 2018, which is incorporated herein by reference in its entirety.

TECHNICAL FIELD

The present technology relates generally to the manufacture of roofing, cladding and/or siding tile/module products, and to systems, assemblies, methods and uses for such products, including the collection of solar and/or thermal energy.

BACKGROUND

The following description is provided to assist the understanding of the reader. None of the information provided or references cited is admitted to be prior art to the present invention.

Overlapping tiles, shingles or modules, particularly for a roofing-type application, are generally known. Typically, a first row of tiles will be laid down at a low level on a pitched roof and then overlaid (sometimes offset) by a second row of tiles, where a rear/trailing portion of the first row is overlapped by a front/leading portion of the second row. The overlapping rows are then built up toward the peak of the roof. A similar overlapping structure can be used in various roofing, cladding or siding situations.

Particularly, in the field of photovoltaic roofing, an elongate length of tile or module (such as described in U.S. Pat. No. 9,518,391, which is incorporated herein by reference) may be located across a roof structure and overlaid with an adjacent tile/module unit. Units of this type may be provided with a molded three-dimensional surface pattern that mimics a tile/shingle type finish. Such an approach overcomes the disadvantages of traditional products, e.g. composites of single tiles/shingles, for these purposes that are heavy and difficult to install, do not have good durability and environmental resistance, and are difficult to mass produce economically.

It is therefore appreciated that improved aesthetics, less weight, less panel materials and less exposure to wind can be achieved when PV panels are integrated into building cladding products. This can also reduce the total material and installation costs associated with a solar electricity system.

Integrated cladding products as described are typically overlaid and then fixed in place relative to each other and the building by use of adhesives and/or fasteners. For example, a contact adhesive strip may be provided on either the underside of an overlapping (exposed) region or the upper side of an underlapping region of a module and, when the layers are overlapped, the contact adhesive holds the configuration in place and a fastener may be driven through a strengthened edge of the exposed region. The fastener passes through both modules and into a building structure underneath. The fastener may be a nail, screw, bolt or like means of fixing one item to another.

It has been observed that, sometimes, the abutting faces of the adjacent modules are not adequately joined/sealed by the adhesive layer. Therefore, a need exists for improving the mating/abutting aspect of the adjacent modules.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF INVENTION

Accordingly, the present invention seeks to provide a roofing/cladding/siding module product and/or system which will go at least some way towards addressing the foregoing problem or which will at least provide the public with a useful choice.

In various aspects, the present invention provides a roofing, cladding or siding product which is light weight, easy to install, weatherproof, durable, resistant to environmental wear, and aesthetically pleasing. One embodiment relates to a module that can be used to form a weatherproof covering over top of a building surface. Another embodiment is a module which can, in additional to forming a weatherproof covering, be used as part of a thermal energy recovery or removal system. Yet another embodiment is a module which can, in addition to forming a weatherproof covering, and optionally in addition to being useful as part of a thermal energy recovery or removal system, bears an array of solar cells to generate electrical energy.

In a first aspect, the present invention provides a roofing, cladding, or siding module comprising: an underlapping region and an exposed region, wherein the underlapping region is adapted to be at least partially covered by the exposed region of an adjacent module when installed on a building surface; and wherein; a) an upper surface of the underlapping region, and/or b) an underside of the exposed region, comprises a textured surface area for increasing the surface area in contact with an adhesive.

Preferably an adhesive is applied, e.g. as a strip, to the other of the upper surface of the underlapping region or underside of the exposed region to face and coincide/align with the location of a textured surface of an adjacent module.

The textured surface may be a region or plurality of regions of dimples or protrusions (e.g. conical, cylindrical or pyramidal peaked, spiked, square, pentahedron, flat top pentahedron, pentagonal, hexagonal, or hourglass). The patch or regions may form an elongate strip located at a leading edge of the exposed region or underlapping region. In the case of the underlapping region the 'leading edge' trails the exposed region and, thus, is across a mid-point of the module as a whole.

In general, the reference to textured area/region should be understood to encompass any suitable surface features that effectively increase the relative surface area in order to more effectively engage/penetrate or improve engagement with an adhesive, as compared to a flat, smooth region of equivalent dimension. The size, shape, density, arrangement and proportion of the elementary parts of the textured region may vary from the illustrated embodiment. The protruding features from the surface may be between substantially 0.05 mm to substantially 2 mm in height (or may be greater than about 0.05 mm, or up to about 2 mm in height). Peaks of the protrusions may be spaced apart by substantially 0.5 mm to substantially 10 mm (or may be greater than about 0.5 mm, or may be up to about 10 mm in spacing apart).

In one embodiment, a height of the protruding features may be substantially 0.5 mm.

In another embodiment, a space or spacing between the protruding features may be substantially 4 mm.

A greater number of protrusions for a given surface area can provide for a greater overall surface area than fewer protrusions.

In the exemplary form the textured surface region is positioned at the leading edge of the underlapping region, to be abutted/contacted with an adhesive strip across a leading edge of an underside of the exposed region. The module is generally configured with the exposed region at a leading edge, the underlapping region at a trailing edge of the exposed region and the textured surface area positioned therebetween.

In an exemplary form there may be provided multiple strips of adhesive and multiple textured surface regions from a leading edge toward a trailing edge. In an exemplary form there may be provided multiple layers of adhesives with different properties or characteristics in a layered or stacked adhesive formation, or as separated adhesive strips.

The module of the invention is generally a plurality of formed surfaces molded from one or more polymeric materials, wherein each of the formed surfaces comprise three-dimensional surface features, and wherein the formed surfaces are joined (i.e., integrated together, juxtaposed, or united) without weld lines or injection moulding points.

In one embodiment, each formed surface is a moulded segment along the length of the module. In one embodiment, the three-dimensional surface features of each of the formed surfaces are the same or different. In one embodiment, the three-dimensional surface features have the same or variable thickness. In one embodiment, the module is substantially flat. In one embodiment, each formed surface comprises an underlapping region and an exposed region, wherein the underlapping region is adapted to be substantially covered by the exposed region of an adjacent module when installed on a building surface.

In one embodiment, the roofing, cladding, or siding module comprises a plurality of formed surfaces moulded from one or more polymeric materials, wherein each of the formed surfaces comprise three-dimensional surface features, and wherein the formed surfaces are sequentially formed in a continuum. In some embodiments, the module is formed as it runs through a continuous forming process (as opposed to a die stamping or injection moulding process). Thus, the formed surfaces with the three-dimensional surface features are sequentially formed in the continuous forming process.

In one embodiment, the outer surface of the exposed region comprises surface ornamentation. In one embodiment, the surface ornamentation resembles asphalt shingles, slate, wooden shakes, concrete tiles, or the like.

In one embodiment, the outer surface of the exposed region comprises a photovoltaic cell or device. In one embodiment, the module further comprises a solar radiation transmissible film which is overlaid upon the photovoltaic cell.

In one embodiment, the profile of the underside of the underlapping surface is patterned in a manner to (1) create turbulence in the airflow, (2) increase the surface area of the module in contact with the passing airflow compared to a module lacking such a surface pattern, or both (1) and (2). In one embodiment, the profile of the underside of the underlapping region comprises a plurality of projections that create a tortuous pathway above the actual or notional plane of the building surface. In one embodiment, the profile of the underside of the underlapping region comprises corrugated form of alternating parallel grooves and ridges.

In one embodiment, the module is moulded from one or more polymeric materials. In one embodiment, the one or more polymeric materials are selected from the group consisting of polycarbonate, foamed polycarbonate, thermoplastic polyurethane (TPU), thermoplastic olefin (TPO), polyvinyl chloride (PVC), aquilobutalstyrene (ABS), styrene-acrylonitrile resin (SAN), thermoplastic rubber, and any other amorphous or crystalline polymer or combination of polymers. In one embodiment, the one or more polymeric materials are flame retardant. In one embodiment, the one or more polymeric materials are weather, hail, ultraviolet, tear, mold and impact resistant.

In one embodiment the formations and adhesives may be configured to provide for a seal (such as a weather-proof or water-tight or water-proof seal) between adjacent modules. Advantageously, the seal may provide for a resistance to wind uplift capability of overlapping modules at front and side edges of the modules (for example, increased resistance to uplift or separate of modules to due wind).

In one embodiment, the formations or projections disposed on the module surface may be varied in shape, density and/or size according to a pre-determined characteristic, such as a viscosity or a bond strength or a resistance to heat or a UV resistance or other suitable characteristics of an adhesive.

In one embodiment, an adhesive may be selected to provide for suitable characteristics, such as viscosity or bond strength or resistance to heat or UV or other suitable characteristics of an adhesive may vary depending on environmental conditions, such as temperature and humidity, or bond strength.

The formations or projections may vary in size, shape and/or density to account for a change in environmental conditions, or to accommodate a wider variation in conditions. For example, the size, shape and density of the formations may be varied to advantageously accommodate a wider temperature range that may be encountered by the adhesive during installation, or to accommodate with different adhesives into or with which the formations or projections are to be put into contact therewith.

In one embodiment the adhesive applied to adhere adjacent modules is epoxy or equivalent. Example adhesives may include:

Epoxy
Thermoset adhesive
Pressure sensitive adhesive
Hot melt adhesive
Silicone adhesive
Urethane adhesive
SPURs (silane-modified polyurethane)
MS (modified silane adhesive)
Cement adhesive
Asphalt adhesive
SBS modified adhesive Such an adhesive is applied as a preformed strip onto the module by an adhesive aside and the opposite side is left with a covering strip to prevent air from contacting and curing the adhesive. The covering strip remains in place until the module is being installed, at which time it is peeled away and discarded, leaving the exposed adhesive to be brought in contact with the textured surface according to the first aspect.

In an embodiment, the adhesive may be disposed on both sides of the module to be brought into contact, i.e. on two separate modules, either onto a module surface, or onto a textured region of formations or projections.

In one embodiment, the adhesive layer may comprise multiple layers of different adhesive on top of each other, advantageously selected for their different properties. Alternatively, or in addition, multiple rows of adhesive may be provided, either as rows of the same adhesive, or different adhesives, advantageously selected for their properties.

In one embodiment, the different layers or rows of adhesive may advantageously provide different properties, for example a first adhesive disposed on a module surface may provide for a strong or long-term bond strength layer. Additionally, or alternatively, an upper adhesive layer or row may be provided with a high tac or initial bond strength, and for example may provide for different characteristics to a subsequent layer or layers of adhesive.

In one embodiment, the different layers or rows of adhesive may advantageously provide for different temperature or humidity characteristics, and/or different viscosities, or strength or bonding characteristics.

In one embodiment, a top layer of adhesive may be provided with a relatively lower viscosity to allow initial embedment of the textured surface formations or projections. In an example embodiment, subsequent layer(s) of adhesive provide may have relatively higher (or different) viscosity or strength or bonding characteristics.

In one embodiment, the module comprises at least two layers of polymeric material, wherein the layers are of the same or different polymeric material. In one embodiment, at least one material has high UV resistance. In one embodiment, at least one material has high thermal conductivity. In one embodiment, the module further comprises a reinforcement layer.

In one embodiment, the module or the polymer layers can be coloured or comprise a blend of colors. In one embodiment, the polymer on the outer layer of the module can be manufactured to mimic traditional roofing products. In one embodiment, the polymer on the outer layer of the module can be coloured to contrast with the colour of the PV cell layer to define an aesthetic feature, e.g. shadows.

In one embodiment, the module comprises a first and a second polymeric material. In one embodiment, the first polymeric material has been foamed. In one embodiment, the first polymeric material is able to chemically bond with the second polymeric material. In one embodiment, the first polymeric material, the second polymeric material, or both further comprise thermally conductive inclusions. In one embodiment, the thermally conductive inclusions have been blended and/or bonded to a compatible polymer or ionomer prior to mixing with the first polymeric material. In one embodiment, the thermally conductive inclusions are aluminum particles. In one embodiment, the second polymeric material can self seal to a penetrative fastener. In one embodiment, the first material is foamed polycarbonate and the second material is thermoplastic polyurethane.

In one embodiment, the top and bottom sides of the underlapping region contain complementary locating elements. In one embodiment, the underlapping region is profiled to define one or more regions for fixing by a penetrative fastener. In one embodiment, the one or more regions for fixing by a penetrative fastener are adapted to receive a nail or screw gun head to accurately locate the fixing.

In one embodiment, the module has a convex precamber configured to apply a pre-load pressure to encourage the edges and bottom surface to contact firmly onto an adjacent underlapping panel when installed on a building. In one embodiment, the upper surface of the underlapping region, the lower surface of the exposed region, or both, comprise a strip of flexible polymeric material configured to prevent water from penetrating between two overlapping modules.

In one embodiment, the module has one or more concertina-shaped features to accommodate thermal expansion and contraction between fixing points.

In one embodiment, the upper surface of the underlapping region comprises channels configured to receive wires of a photovoltaic array. In one embodiment, the upper surface of the underlapping region comprises markings to show the correct position of wires and junctions for a photovoltaic array. In one embodiment, the upper surface of the underlapping region comprises pockets or channels configured to receive printed circuit boards (PCB), communication devices, junction boxes, wires, buses, components, cells, and/or diodes of a photovoltaic array.

In one embodiment, the module is manufactured by a continuous forming process. In one embodiment, the module is continuously formed into a horizontal strip capable of extending substantially across an entire section or width of the building surface to be covered. In one embodiment, the module is continuously formed into a vertical strip capable of extending substantially down an entire section or length of the building surface to be covered.

In one embodiment, the modules overlap down the fall of the building surface. In one embodiment, the modules overlap across a building surface. As mentioned, each module is adapted to be fixably attached to the building surface by at least one fastening member or adhesive. In one embodiment, at least one fastening member is a nail, staple or screw. In one embodiment, the roofing, cladding, or siding assembly forms a weathertight seal over the building surface.

In one embodiment, the system further comprises a heat exchanger. In one embodiment, the heat exchanger is part of an air conditioning system, water heating system, or air or media (e.g., sand, ground glass, or concrete) heating system.

In one embodiment, the system further comprises a vent for exhausting the air flow. In one embodiment, the system further comprises a heat exchanger adapted to receive the air flow. In one embodiment, the air flow is induced by a fan. In one embodiment, the speed of the fan is proportional to the energy created by one or more PV cells. In one embodiment, the air flow is reversible in order to heat the roof to remove snow, ice, and/or moisture. In another embodiment, the air flow is able to move air from a warmer section of the roof to a cooler section of the roof. In one embodiment, the system is operable (a) to generate electricity from the one or more photovoltaic cells and (b) to duct an induced or uninduced air flow to be heated and outputted to the heat exchanger during times of solar absorption or heat transmission by the modules.

In one embodiment, the method further comprises venting the airflow to the outside of the building. In one embodiment, the method further comprises collecting the thermal energy from the airflow after it passes through the air passage. In one embodiment, the collecting of thermal energy is by placing the airflow in thermal contact with a cooler fluid. In one embodiment, the cooler fluid comprises part of an air conditioning or water heating system.

In a further aspect, the present invention provides a method of manufacture of a roofing, cladding, or siding module. The method comprises: providing to a continuous forming machine a feed material able to assume and retain a form after being moulded between a first forming surface and a second forming surface; allowing the formation to take place as such surfaces are advanced in the same direction; wherein the output is a roofing, cladding, or siding module comprising: an underlapping region and an exposed region (wherein the underlapping region is adapted to be at least partially covered by the exposed region of an adjacent module when installed on a building surface) and wherein; a) an upper surface of the underlapping region, and/or b) an underside of the exposed region, comprises a textured surface area (for increasing the surface area) that would be, in use, in contact with an adhesive.

In one embodiment the textured surface area is a plurality of projections or dimples. The projections may be formed in groups or patches along the continuous length of the module as it is formed. The feed material may comprise a layer of a first material beneath a layer of a second material. In one embodiment, the first material is extruded to a supporting surface of a continuous forming machine, and the second material is extruded to the top surface of the feed of first material. In one embodiment, the exposed region comprises both materials, and the underlapping region comprises, at least in part, only one of the materials. In one embodiment, the axis of advancement of the materials in the continuous forming machine is commensurate with the longitudinal axis of the module as it lies with the longitudinal axis across the fall of a roof to be clad thereby.

In one embodiment the entire roofing, cladding or siding module is made from a single material.

In one embodiment the module design features can be achieved by thermoforming, pressing, or other method of forming, either continuously or discontinuously wood, metal, concrete, resins, glass, clay, composites or the like.

The roofing, cladding, or siding module may have (i) a region to underlap a like or other module and (ii) a region to overlap a like or other module; wherein the overlap region has on, or at least towards, its upper surface serially formed zones of three dimensional features, such zones being of polymeric material(s) provided as a continuum for that module's zones.

In some embodiments, the polymeric material is a layer over at least one underlying layer of polymeric material(s). One or other of the polymeric materials may include a thermally conductive inclusion. In one embodiment, each such zone of three dimensional features of an overlap region and a corresponding part of an underlap region is formed simultaneously. In one embodiment, the same polymeric material(s) provides each said zone and at least part of the underlap region.

In one embodiment, each region to underlap and each region to overlap are three dimensionally contoured. Such contouring can be through to the under surface to provide for compatibility in overlap indexing. In one embodiment, the overlap region on its upper surface is both dimensionally contoured for aesthetic purposes and provided with zones of features for solar related functionality purposes, e.g. features for association with photovoltaics. In one embodiment, such zones of three dimensional features are mutually juxtaposed or at least mutually close.

In a further aspect, the invention provides a building integrated solar energy recovery system, the system comprising, including or using a roofing, cladding or siding of modules or the equivalent ("modules") partially overlapping their adjacent modules down and/or across a building surface yet to collect in sunlight either, or both, (a) heat solar energy as heat at least in part to pass to an underlying air flow, and/or (b) to generate electricity photovoltaically for outputting and consequential heat at least in part to pass to said underlying air flow. In one embodiment, the modules, as installed on the building surface, with profile features of each module, provide an underlying pathway for an airflow to be heated by solar energy absorption and/or transmission through said modules. In one embodiment, as part of the cladding array, photovoltaic devices or functionality included and/or carried by a region or regions of any one or more module are not overlapped by an adjacent module.

In one embodiment, when as part or as part of a series down or across an underlying building surface, is useable whereby each photovoltaic receiving region is fully exposed despite partial overlapping of one component to another to better shed water; and is useable whereby, despite attachment to the underlying building surface, there is a setout from the underlying building surface sufficient to allow a passage of an underlying airstream.

In some embodiments, at least part of the profile of each roofing component has been moulded (i) by a continuous forming technology; and/or (ii) to accommodate a photovoltaic functionality; and/or (iii) to accommodate interconnection functionalities of photovoltaic areas; and/or to define at least in part said configuration; and/or (iv) to be very much greater in dimension across the building surface to be covered than the dimension it will cover down said building surface; or (v) to be very much greater in dimension down the building surface to be covered than the dimension it will cover across said building surface.

In some embodiments, the dimension of the module in the direction that extends across the building surface is at least 3 times, or at least 4 times, or at least 5 times, or at least 10 times, or at least 15 times, or at least 20 times that of the dimension of the module that extends down the building surface. In some embodiments, the dimension of the module in the direction that extends down the building surface is at least 3 times, or at least 4 times, or at least 5 times, or at least 10 times, or at least 15 times, or at least 20 times that of the dimension of the module that extends across the building surface.

The roofing, cladding or siding assembly may comprise or include a structure to provide a support surface, and a plurality of modules to cover the underlying support surface, the modules relating to any neighbor(s) in an overlapping arrangement down the fall or pitch of the underlying surface, thereby to define the exterior fall or pitch of the roofing, cladding or siding assembly; wherein at least some of the modules include photovoltaic ("PV") devices exposed to sunlight able to generate an electrical output; and wherein the plurality of modules define a pathway above the support surface for an air flow, induced or otherwise, to be heated by heat exchange from at least some of the modules as a consequence of heating of the modules by received sunlight or heating of the modules as a consequence of the effect of received sunlight on the PV devices, or both.

In a further aspect the invention utilizes a method of manufacture of a roofing, cladding or siding component, or substrate therefor, which comprises or includes the steps of: providing to at least one of the forming surfaces of a continuous or discontinuous forming machine a feed of material able to assume and retain a form after being moulded between that first mentioned forming surface and a second forming surface, and allowing that formation to take place as such surfaces are advanced in the same direction; wherein the output is of a form having a profiled region to step out part of that region from an underlying actual or notional planar surface, yet providing another region to, at least in part, overlap said profiled region of a like form. The region to, in use, overlap an underlapping region (and/or underlap an overlapping region) of an adjacent module may have a textured surface, such as a plurality of projections, to improve bonding by an adhesive applied to one or both of the layers. The form of the textured surface may be an elongate strip along the continuous module formed by the machine.

An elongate adhesive surface may be applied to a surface of the module to, in use, align for contact with the textured surface of an adjacent module. Application may be during continuous forming or in a post-production operation when the module is cut to length to span across a building structure. The elongate adhesive surface may be a preformed strip, supplied with a covering on one or both sides, where the side to be aligned with the textured surface is maintained in a covered state until it is required for bonding modules together.

In one embodiment the module component has been formed by a feed of materials into a continuous forming machine to profile at least one or either, or both, of the first and second regions or at least parts thereof; and wherein the advance direction of the continuous forming machine defines the elongate axis of the component that is to lie across the fall of the building surface.

The roofing, cladding or siding module may be adapted to be fixed with its elongate axis across the fall of the building surface to be clad; the module having a first longitudinal region to underlie, in use, a like module or flashing, and a second longitudinal region, in use, to overlie a like module or to simply be exposed; wherein the first and second regions share in common a first material; and wherein the first and second regions share in common a second material, yet the second region has its upper surface defined by a second material while only part of the first region (i.e. that part of the first region proximate to the second region) has its upper surface defined by said second material; and wherein there has been such sharing of the first and second materials since a continuous forming process; and wherein one, some or all of the following apply: (i) at least the underside of the first region defines a profile of projections (e.g. mesa-like or otherwise) to stand the remainder of the first region off from an actual support or notional support plane; (ii) such projections define a tortuous pathway above the actual or notional plane; (iii) the topside of the first region, with depressions, provide a female version of the male underside; (iv) the second material is weather resistant; (v) the first material has been foamed; (vi) the first material includes particulate thermally conductive inclusion; (vii) the second material can self seal to a penetrative fastener; (viii) the first material is a polymeric material, the second material is a polymeric material, at least the upper surface of the second region has been profiled; (ix) the upper surface of the second region has been profiled to simulate conventional roofing products (e.g. tiles, slate, shingles shakes or the like); (x) the upper surface of the second region channels, pockets or the like to accommodate or accommodating the buses and/or cells of a photovoltaic array; (xi) the first and second materials have been coextruded or serially extruded into a continuous forming machine; and (xii) the extrusion has been into an advancing continuous forming machine where the elongate axis is aligned to the advancement.

The invention may provide a roofing shingle, tile or equivalent module ("shingle") substantially as herein described, with or without reference to the accompanying drawings.

In a further aspect, the invention provides a roof clad by roofing components of any aspect of the present invention.

In a further aspect, the invention provides a building surface clad by cladding or siding components of any aspect of the present invention.

The foregoing summary is illustrative only and is not intended to be in any way limiting. In addition to the illustrative aspects, embodiments, and features described above, further aspects, embodiments, and features will become apparent by reference to the following drawings and the detailed description.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

DETAILED DESCRIPTION

Figure 1:
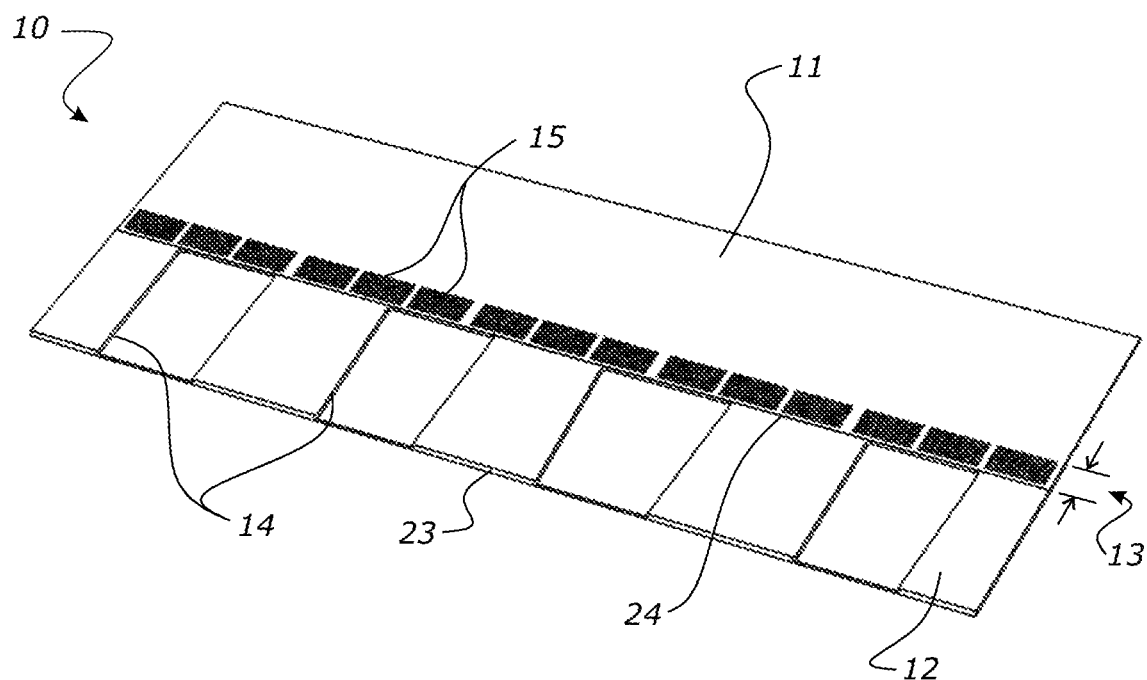
FIG. 1 shows an illustrative embodiment of a continuously formed roofing, cladding or siding module in its basic form.

It is to be appreciated that certain aspects, modes, embodiments, variations and features of the invention are described below in various levels of detail in order to provide a substantial understanding of the present technology.

The present technology is described herein using several definitions, as set forth throughout the specification. Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

As used herein, the term "formed surface" refers to a moulded segment of a polymeric material corresponding to an individual dye or mold of a continuous forming machine.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing membrane attached to the roof deck adjacent an eave of the roof for preventing water damage to the roof deck and an interior of a building from wind-blown rain or water buildup on the roof. The roof deck is typically made of an underlying material, such as plywood. The waterproof membrane may be any of a number of waterproof roofing membranes known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes). One exemplary membrane sheet is Deck-Armor™ Roof Protection, manufactured by GAF Corp., Wayne, N.J.

As used herein, the term "roofing" means the provision of a protective covering on the roof surface of a building. Without limitation, such a protective covering might take the form of shingles, tiles, panels, shakes, planks, boards, modules, moldings or sheets.

As used herein, the terms "cladding" and/or "siding" mean the provision of a protective covering on a side or other surface of a building. Without limitation, such a protective covering might take the form of shingles, tiles, panels, shakes, planks, boards, modules, moldings or sheets.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "thermally conductive particles" or "thermally conductive inclusions" refers to particles or inclusions of any conductive material. These include, but are not limited to, particles of the following materials: metals, metal hybrids, carbon, silica, glass, conductive polymers, salts, carbon nanotubes and compounds of these substances. In addition to assisting in heat transfer, the thermally conductive particles or inclusions may also act as a reinforcing material.

As used herein, the term "polymer" (and associated terms such as "polymeric") includes polymers, polymer blends, and polymers with or without additive inclusions.

The present technology relates to a cladding or roofing product. In some embodiments, the product comprises modules having g a plurality of formed surfaces moulded from one or more polymeric materials (which may be in layers), wherein each of the formed surfaces comprises three-dimensional surface features. The present technology also relates to a product having good thermal conductivity and a capacity for photovoltaic ("PV") and/or solar thermal energy generation, and related subassemblies, assemblies, uses and methods. The present technology has several advantages. For example, the roofing, cladding or siding product may reduce the amount of heat energy transferred to the interior of the building upon which it is mounted; and/or to provide a system which incorporates a roofing, cladding or siding product to that effect; and/or to provide a method by which mass production of such a product could be achieved; or at least provides the public with a useful choice.

In other embodiments, the present invention provides a Building

Integrated Photovoltaic ("BIPV") and/or solar thermal roofing, cladding or siding product which is reasonably light weight, easy to install, durable and resistant to environmental wear; or at least provides the public with a useful choice.

In other embodiments, the present invention provides a BIPV and/or solar thermal roofing, cladding or siding product that does not require a fastener (nail, screw, bolt, etc.) to penetrate the exposed surfaces of the roof, thereby making the product less likely to leak compared to convention BIPV products; or at least provides the public with a useful choice.

In other embodiments, the present invention provides a BIPV and/or solar thermal roofing, cladding or siding product capable of large surface area coverage, that can be mass produced in high volumes and with reasonable speed of production; and/or to provide a method by which such mass production of such a product could be achieved; or at least provides the public with a useful choice.

In other embodiments, the present invention provides a BIPV and/or solar thermal roofing, cladding or siding product which will allow heat energy to be transferred away from the photovoltaic cell to maximize its operational efficiency; and/or to provide a system which incorporates a BIPV roofing, cladding or siding product to that effect; and/or to provide a method by which mass production of such a product could be achieved; or at least provides the public with a useful choice.

In yet other embodiments, the present invention provides a building integrated system which allows solar, ambient and photovoltaically generated heat to be transferred away from a building surface and used elsewhere; and/or the components of such a system; and/or a method of manufacturing such components; or at least provides the public with a useful choice.

Various embodiments of the present invention relate to a roofing, cladding or siding product to be secured to a building in a lapping arrangement. In one embodiment the product is formed as a module to be laid horizontally across a surface and lapped vertically down that surface, however, it is also possible to manufacture the product so as to allow it to be laid in vertical columns which would then lap across the surface. In particular, three illustrative embodiments of the product are described below. The first is a module which can be used to form a weatherproof covering over top of a building surface; the second is a module which can, in additional to forming a weatherproof covering, be used as part of a thermal energy recovery system; and the third is a module which can, in addition to forming a weatherproof covering, and optionally in addition to being useful as part of a thermal energy recovery system, bears an array of solar cells to generate electrical energy.

In the following description the general features of the product and their functional advantages are described. It should be appreciated that all of the various features may or may not be present depending on which embodiment of the module is required. Furthermore, there may be various combinations of the features and combinations of the embodiments, which although not specifically referred to, are intended to be covered by this specification.

In one aspect, the present invention provides a roofing, cladding or siding product which is reasonably light weight, easy to install, durable and resistant to environmental wear. In some embodiments, the roofing, cladding or siding product is capable of large surface area coverage, can be mass produced in high volumes and with reasonable speed of production; and/or provides a method by which such mass production of such a product can be achieved.

In one embodiment, the roofing, cladding or siding product is a module comprising a plurality of formed surfaces moulded from one or more polymeric materials (which may be in layers), wherein each of the formed surfaces comprises three-dimensional surface features, and wherein the formed surfaces are joined without weld lines or injection moulding points. Each formed surface refers to a moulded segment along the length of the module that corresponds to an individual dye or mold of a continuous forming machine.

Reference to a continuous forming technology is made with reference to each of WO2007/058548 and WO2007/058549, the contents of which are hereby incorporated in their entirety by reference.

Use of the term "joined" in this context is not intended to require that each of the formed surfaces were ever separated, i.e., the formed surfaces may be integrally formed together in situ during the manufacturing process. In another embodiment, the module design features can be achieved by thermoforming, pressing, or other method of forming, either continuously or discontinuously wood, metal, concrete, resins, glass, clay, composites or the like.

Figure 9:
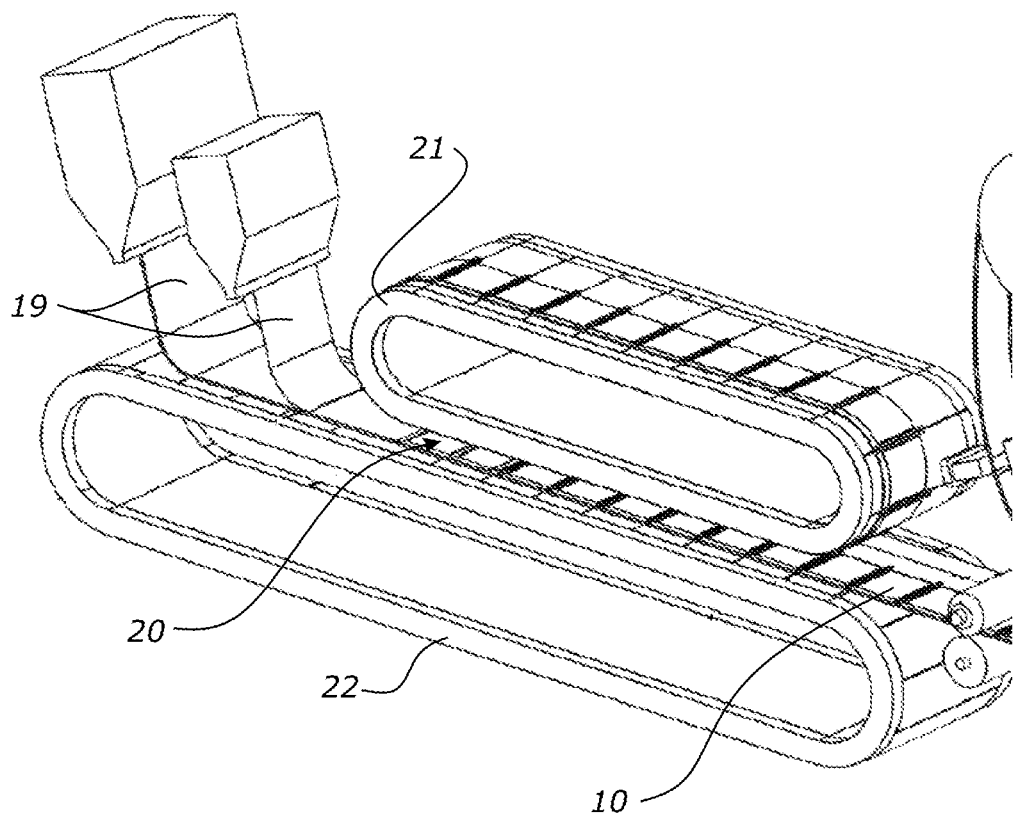
FIG. 9 shows diagrammatically a continuous forming apparatus contemplated as providing for the continuous forming of various modules described herein.

In particular, the product can be manufactured in long strips (as seen in FIG. 9) by a continuous process which incorporates a continuous forming step, and therefore can be made in varying lengths as required depending on the required coverage area.

Production is such that a single moulded module, capable of extending across the entire width or section of the roof or building to be protected, can be manufactured. For example, the modules may be very much greater in dimension across the building surface to be covered than the dimension it will cover down the building surface.

In one embodiment, the dimension of the module in the direction that extends across the building surface is at least 3 times, or at least 4 times, or at least 5 times, or at least 10 times, or at least 15 times, or at least 20 times that of the dimension of the module that extends down the building surface. Alternatively, the modules may be very much greater in dimension down the building surface to be covered than the dimension it will cover across the building surface.

In one embodiment, the dimension of the module in the direction that extends down the building surface is at least 3 times, or at least 4 times, or at least 5 times, or at least 10 times, or at least 15 times, or at least 20 times that of the dimension of the module that extends across the building surface.

In some embodiments, the modules are about 0.2-1 meters in length, 1-20 meters in length, about 3-10 meters in length, or about 4-8 meters in length, or 2-4 meters in length. Modules of 4-5 meters in length, and modules of 8 meters in length are suitable manufacturing sizes, but the manufacturing process allows custom lengths to be accommodated just as easily. A plurality of such modules can then be arranged in lapping rows down the surface of the structure, for example, as shown by the lapping roof shingles seen in FIGS. 7 and 8.

Figure 2:
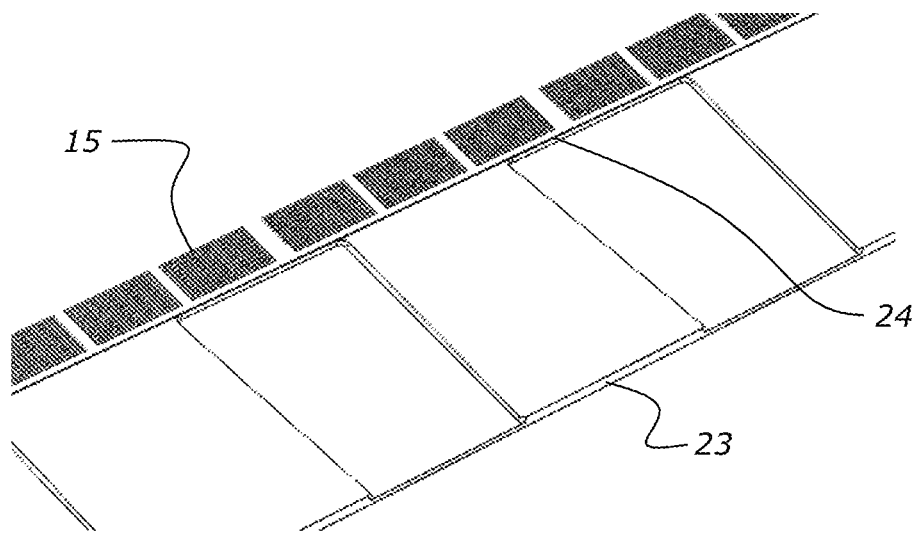
FIG. 2 shows an illustrative embodiment of a closer view of the continuously formed roofing, cladding or siding module
Figure 3:
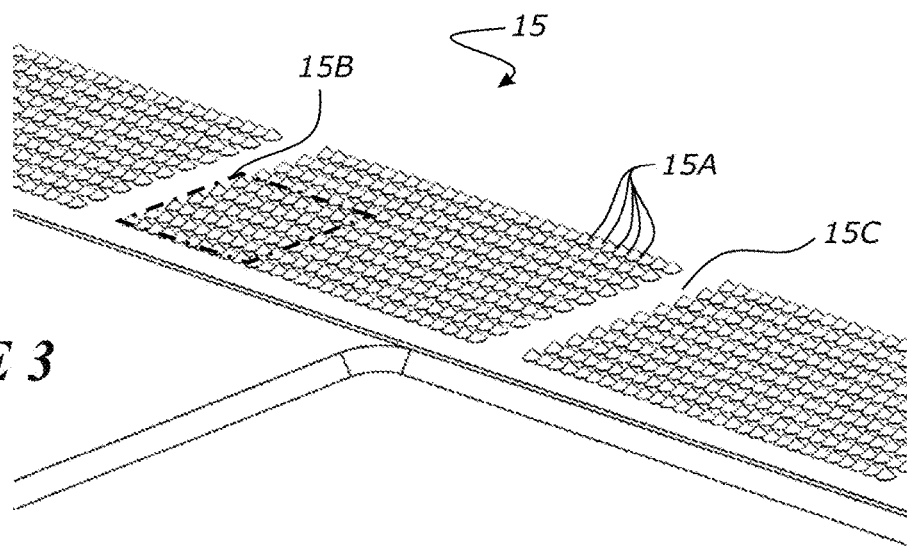
FIG. 3 shows an illustrative embodiment of a yet closer view of an underlapping, fixing region of an illustrative embodiment of the roofing module.

The features of an illustrative embodiment of the basic roofing module product 10 are as shown in FIGS. 1 to 3. Particularly, there is an underlapping region 11, and an exposed region 12 (i.e. to be exposed when a series of modules are positioned in a lapping arrangement). There may also be a fixing region 13 where the module 10 is to be attached to the building surface, and this may or may not be within the underlapping region 11, but is suitably or optionally within the underlapping region 11.

The regions may exist in various proportions comparative to each other, and there may be profiling or contouring 14 of any or all regions in a continuous or discontinuous pattern along the length of the module 10. Alternatively, region 14 may comprise a cut out or non-continuous region. In one embodiment, the width of the underlapping region 11 approximately equals the width of the overlapping region 12. In other embodiments, the width of the underlapping region 11 is about 95%, about 90%, about 80%, about 75%, about 60%, about 50%, about 40%, about 30%, about 25%, about 15%, or about 10% of the width of the overlapping region 12. In some embodiments, the overlapping region 12 is from about 5 cm to about 60 cm wide and the underlapping region 11 is from about 5 cm to about 60 cm wide.

Variations in the profiling or contouring can be used to create different stylistic or ornamental effects. For example, the module may be moulded with a sinusoidal profile, to simulate concrete tiling; an angular profile, to simulate weatherboarding; with relief features on its upper surface, to simulate asphalt shingles; or with a variable upper surface contour to simulate slate tiling or wooden shakes. The continuous forming process allows a variety of different 3D surfaces to be produced with the same equipment simply by swapping out the die faces on the forming machine as required.

The color and visual properties of material feeds can be changed by inputting different materials and additives (particularly coloring additives) at the feeding stage, generally shown by FIG. 9. This means that it is possible to mass manufacture consecutive runs of different types of product (e.g. a product simulating concrete tiles, a product simulating slate tiles and a product simulating asphalt shingles) without significantly altering the equipment on the manufacturing line.

Figure 7:
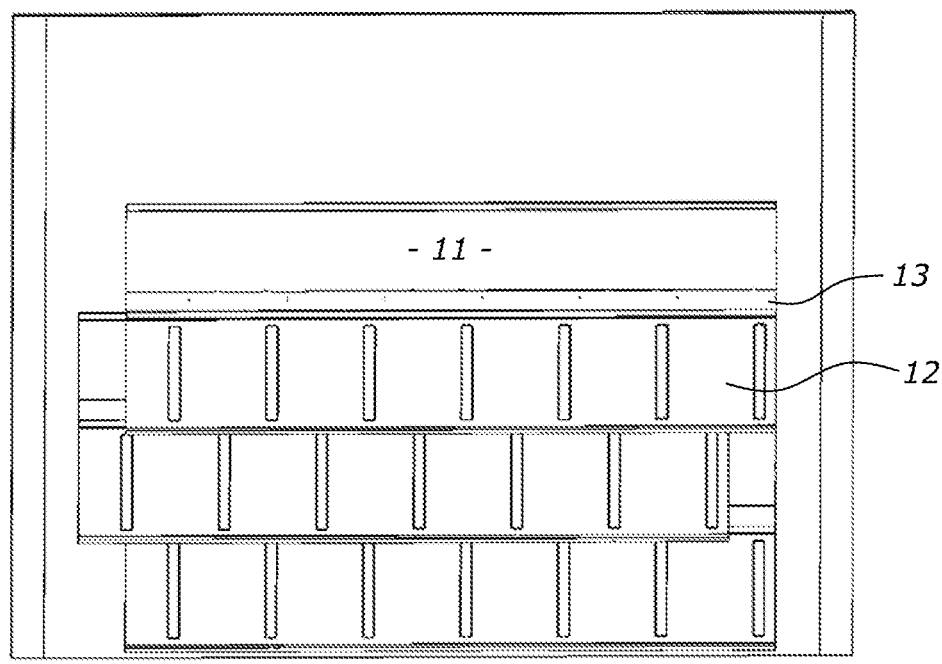
FIG. 7 shows an illustrative front view of a series of overlapping continuously formed roofing, cladding or siding modules being installed upon a building with offset vertical alignment for added visual appeal.

The modules may be installed in various vertical alignments as desired and/or as permitted by the surface contouring 14. An offset vertical alignment as shown in FIG. 7 gives the effect of traditional 'tiled' roofing, while other alignments will also produce interesting visual and/or stylistic effects. In an example embodiment, the modules may include a cut-out or non-continuous region, such as in the region indicated by 14 in FIG. 1. Such a cut out may advantageously give the effect of a traditional 'tiled' roofing cover, and may also aid in alignment of the modules.

FIGS. 1 to 3 provide detail of a 'fixing region' 13 which, in the illustrated form, may include a textured surface patch or region 15 or, particularly, a series of textured regions 15 or continuous strip. The fixing region 13 may provide for an adhesion or fastening between adjacent modules at the region indicated (this is explained in more detail in regard to FIG. 8 below). Advantageously, the fixing region 13 may reduce module or tile 'curl', where a leading edge of a module or tile may lift from an adjacent underlapping tile. Additionally, the fixing region 13 may improve the strength and weather-proof nature of the modules when installed, by providing a fixed or adhered region between the exposed areas of adjacent modules.

In relation to the term 'textured surface area' or 'textured surface region', as used herein, this means a surface comprising of one or a plurality of formations provided as a regular or irregularly arranged array or pattern. The formations may be provided as projections on a surface, or recesses into a surface, for example upon or in a roofing module as described herein. Such formations can be provided as a sequenced series of shapes, whether being of the same or different height, or whether being of the same or different geometry of shape, or each formation or grouping of formations being provided of the same or different spacing, or of a different density of formations (i.e. number of formations per unit area), or said formations may be provided of the same or different material of the molded module, or said formations may be provided to be of the same or different rigidity or flexibility of said formations to an opposing surface of an adjacent module to which said formations are to be brought into or toward contact therewith, or said formations may be provided so as to be of variable rigidity or flexibility within a grouping of said formations.

The formations may be provided as protrusions or projections extending from a surface of the module (i.e. a projection extending from a surface of said module or a said adjacent module). Alternatively, the formations may be provided as a recess into a surface of the module.

In an example embodiment, the series of textured regions 15 may be separated by a gap 15C to substantially correspond to a cut out or non-continuous region of the module 14, as outlined above in relation to FIG. 1. This advantageously may provide for an improved visual appearance, as such a gap 15C may reduce the appearance of the textured surface 15 through the cut-out region 14 when the modules are installed, and may be an area devoid of projections 15C.

The textured region 15 is shown in closest detail by FIGS. 3-6, where it can be seen to be comprised of a plurality of projections or dimples 15A, disposed on a leading edge of an upper side of an underlapping region 11. In general, the textured region should be understood to encompass any suitable surface features that effectively increase the relative surface area in order to more effectively engage or improve engagement with an adhesive, compared to a flat, smooth region of equivalent plan area dimension. A projection type form of textured surface also serves to penetrate into an adhesive layer, such as an adhesive strip 16, for improved bonding therewith. The size, shape, density, arrangement and proportion of the elementary parts of the textured region may vary.

Figure 3A:
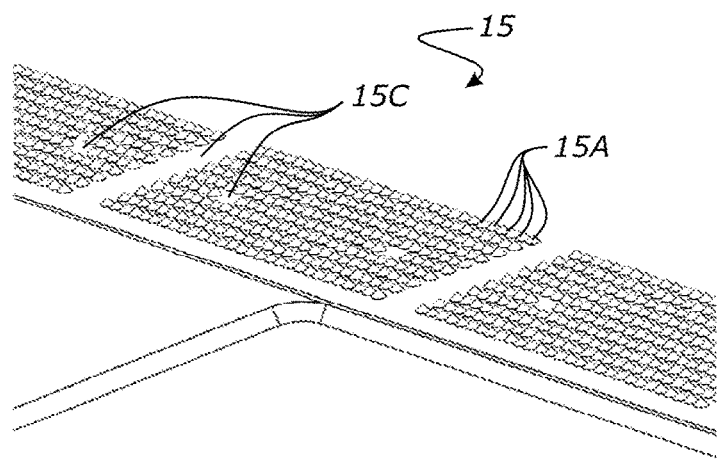
FIG. 3A shows an alternative embodiment of a yet closer view of an underlapping, fixing region of an alternative embodiment of the roofing module.

In an example embodiment shown in FIG. 3A, the textured regions 15 may comprise an area devoid of projections 15C that is substantially circular in shape, provided for receiving a fastener, such as a nail or screw. In an example embodiment, the regions between rectangular areas 15C of projections 15 may alternatively or additionally be provided for receiving a fastener. This is also described below in relation to FIGS. 8 and 8A.

In an example embodiment shown by FIG. 1, textured surface area(s) or region(s) 15 is/are located adjacent a trailing edge of exposed region 12, upon the leading edge of underlapping region 11. In use, region(s) 15 will be hidden from view under the overlapping exposed region 12 of an adjacent module. However, as outlined above, a gap 15C may substantially correspond to a cut out 14 in the overlapping region 12. An adhesive, e.g. in strip form, may be applied to a region that, in use, is opposing and aligned with the textured surface region(s) 15. In the illustrated form such an adhesive strip 16 would be located on the underside of the leading (front) edge of the exposed region 12. The textured region 15 may be brought into contact with the adhesive disposed on an underside of an exposed region 12 during installation. However, in an alternative example embodiment, the adhesive and textured surface locations may be reversed, i.e. the textured surface 15 may be disposed on an underside of an exposed region 12 of a module, with the adhesive disposed on the leading edge of the underlapping region 11. In a further alternative example embodiment, a textured surface 15 may be provided on both an underside of an exposed region 12 of a module, and on an upper surface of an underlapping region 11. In such an example embodiment, an adhesive may be provided on one or both textured regions 15, for example a contact adhesive, or peel sheet adhesive. In an example embodiment, textured surfaces on both the regions outlined above may be arranged to interact or mesh when brought into contact.

In the context of the description and drawings 'leading edge' refers to the direction of the foremost/exposed edge 23 of the exposed region 12 that is ultimately visible on a finished building structure. Leading edge 23 of the exposed region 12 is trailed by the leading edge 24 of the underlapping region which is the forward-most part covered by an adjacent module's exposed region.

In an example embodiment the adhesive strip 16 (see FIG. 8, 8A) may be a pre-formed length, either continuous or intermittent, that, on one side, permanently adheres to the exposed region 12 underside while, on a second side is supplied with a covering strip to protect the adhesive from contamination and premature curing. The covering strip may be removed, to expose adhesive 16, only during installation upon a building structure.

In an alternative example embodiment, the adhesive strip 16 (see FIGS. 8, 8A) may be an extruded adhesive, for example extruded in a continuous or intermittent length and/or width onto a module (such as a tile or panel) surface. In an example embodiment, the extrusion of adhesive may be directly onto the exposed region or underlapping region, for example using a continuous forming process by a CFT machine.

In either of the abovementioned adhesive embodiments, the adhesive 16 may be provided with a release sheet, or without a release sheet. In an alternative embodiment, a release type sheet, or release region with relatively low adhesive characteristics may be provided on a second module, to be stacked onto a first module. In such an embodiment the release sheet or region may be provided such that the modules may be stacked, but not substantially adhered, and unstacking the modules may release the adhesive region 16. In an example, regions 15 and 16 may comprise contact adhesive regions, or reactive regions to activate an adhesive upon contact.

Figure 4:
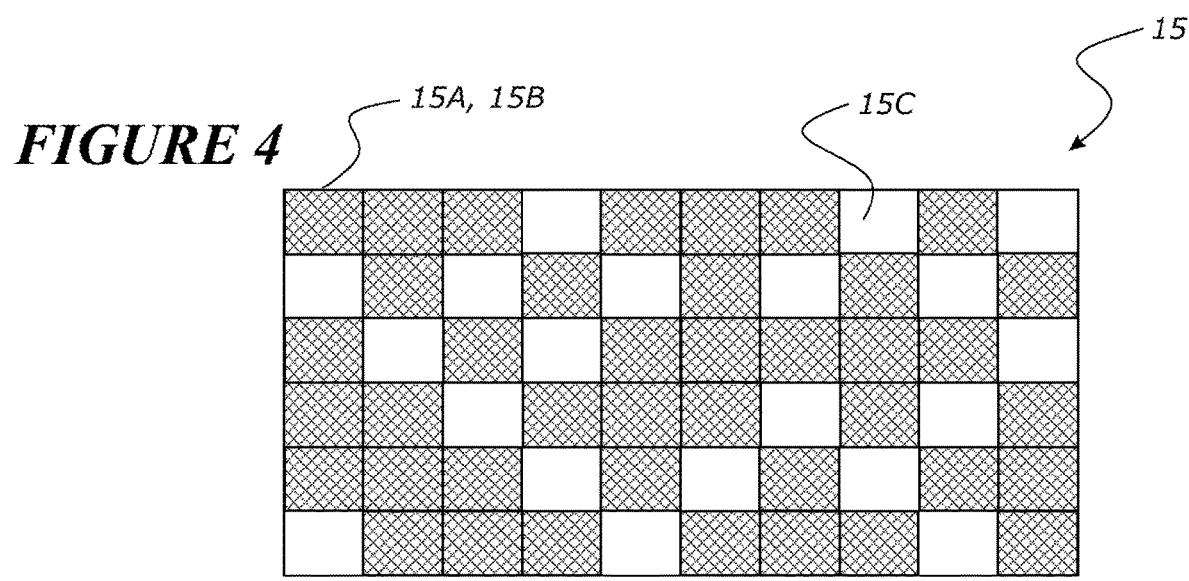
FIG. 4 shows an illustrative embodiment of a top down view of a fixing region of an illustrative embodiment of the roofing module.

FIG. 4 illustrates an example embodiment of a textured region 15, shown in a grid form. In an example embodiment, the crosshatched regions shown in FIG. 4 may comprise of either individual projections 15A, or arrays of projections 15B, or both. For example, the crosshatched regions in FIG. 4 could comprise one or a plurality of projections, such as any of the projections shown in FIGS. 5A-H, or FIGS. 6A-C, either as individual projections, or arrays of projections, in each area of the grid.

The blank grid spaces or sections shown in FIG. 4 may comprise areas devoid of projections 15C. It will be understood that the projections 15A, or arrays of projections 15B, or areas devoid of projections 15C, may be distributed in a random or semi-random distribution, or may be arranged or distributed in a pattern or repeating region. In an example embodiment, the pattern or random distribution of projections 15A/B and areas devoid of projection 15C as outlined above may be arranged in a repeating manner, suitable for being continuously formed in a continuous forming machine via CFT, either formed onto a molded module 10, or produced when forming said molded module 10.

The areas devoid of projections 15C may provide for a region allowing displacement of adhesive as projections 15A are brought into contact with adhesive. Additionally, these areas devoid of projections 15C may provide for a gap or spacing between arrays of projections 15B, to provide for improved aesthetics as outlined above. For example, to align with a cut-out region 14 of the overlapping region 12.

In an example embodiment, areas devoid of projections 15C may be provided to allow for a fastener, e.g. nail 17 (see FIGS. 8 and 8A), that can be driven through underlapping region 11 (or, in a further form, both exposed region 12 and underlapping region 11) into a building structure. Alternative fixing arrangements may be made between the modules and building but, according to the invention, adjacent modules are secured together by, at least, an adhesive bond improved by a textured surface 15. Additionally, a fastener, such as a nail, may penetrate the module.

FIGS. 5A-5H illustrate example projections 15A or arrays of projections 15B according to example embodiments of the invention.

Figure 5A:
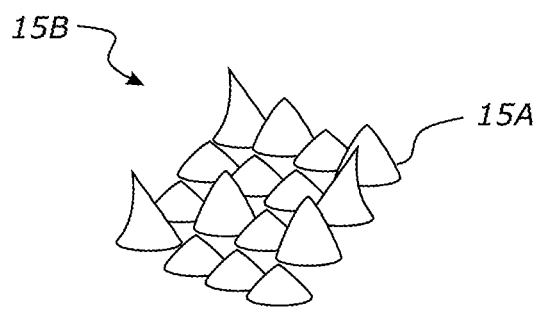
FIGS. 5A-5H show illustrative embodiments of fixing projections in a fixing region of an illustrative embodiment of the roofing module.

FIG. 5A shows an example of varying size and height of projection 15A, as well as varying projection direction or 'lean'. Such projections may have a hook or horn or peak shape, with varying orientation direction. In an example embodiment, such a lean or direction of projection may advantageously provide improved adhesion between a textured region 15 and an adhesive strip region 16, for example by providing an opposing force in a direction opposite to that typically experienced by a molded module 10 or roofing system formed of said modules 10. Similarly, a varying in height of projections 15A such as illustrated in FIG. 5A may provide improved adhesion between a textured region 15 and an adhesive region 16, for example by allowing additional penetration into an adhesive.

In an example embodiment (not shown), projections on a leading edge or towards a leading edge 23 of the modules 10 may be higher, curved, and/or may be provided with a lean or direction as outlined above. Such a configuration may advantageously provide for improved adhesion between modules at a leading edge 23, which may be most susceptible to high forces (e.g. due to wind and weather).

Both the varying of projection height and varying projection direction or 'lean' may advantageously provide an improved initial tac, or initial adhesion, or initial embedment when modules are first brought into contact (i.e. when projections are initially brought into contact with an adhesive). For example, when installing molded modules 10, textured region 15 may come into initial contact with adhesive strip 16, and a plurality of higher projections may provide for an earlier embedment of some projections, which may aid in installation of the modules 10.

Figure 5B:
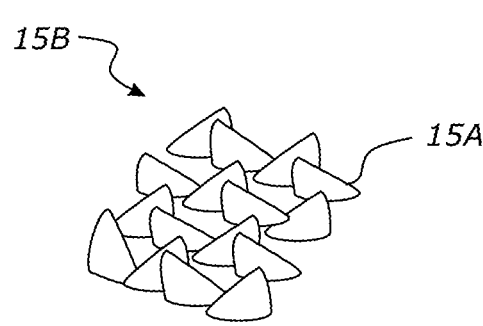

FIG. 5B illustrates another example embodiment of projections 15A, showing a varying projection direction as outlined above in relation to FIG. 5A. In this example embodiment, the projections are of similar height, but varying direction of orientation.

Figure 5C:
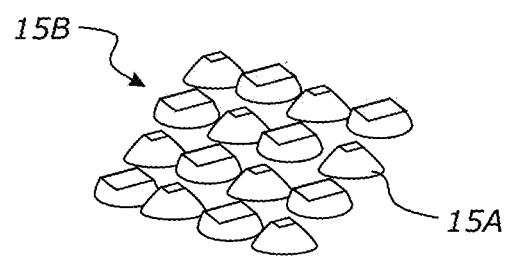

FIG. 5C illustrates an example embodiment of projections 15A, showing projections of a similar height, but of varying upper surface area or cross section. Such an example embodiment may advantageously provide for a varying tac or adhesion as an adhesive is brought into contact with textured region 15, which may assist with installation of modules 10.

Figure 5D:
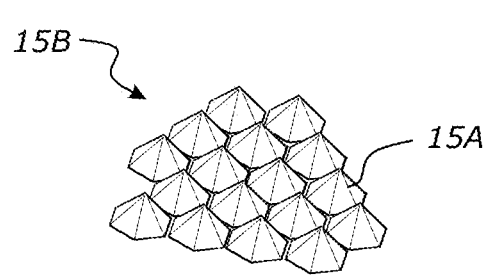

FIG. 5D illustrates an example embodiment of projections 15A, showing projections with a sharpened or spiked or peaked profile. Such an example embodiment may advantageously provide for an improved bite or penetration or embedment into or of an adhesive, such as adhesive region 16 when brought into contact with textured region 15.

Figure 5E:
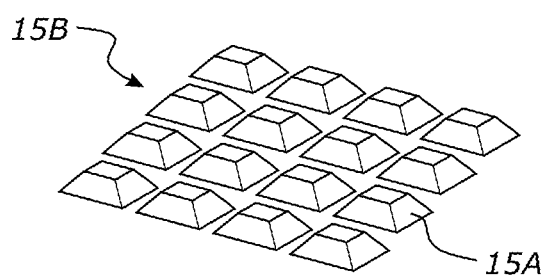

FIG. 5E illustrates an example embodiment of projections 15A arranged in a uniform pattern. Such an example embodiment may advantageously provide for a predictable and/or uniform adhesion between an adhesive and said projections, for example adhesive region 16 and textured region 15.

Additionally, the projections shown in FIG. 5E are separated by a spacing 15C, which may advantageously provide for a region for an adhesive to move or flow too as said projections are brought into contact with an adhesive. Put another way, a spacing 15C between projections 15A may advantageously facilitate the displacement of an adhesive. A spacing 15C between formations 15 may also advantageously reduce material usage when forming said projections or formations. The spacing 15C (or any pattern or shape or projection or textured surface 15 as outlined herein) may also accommodate undulations, patterns, or textures on an underside of the exposed region 12 to be brought into contact with said textured surface 15.

Figure 5F:
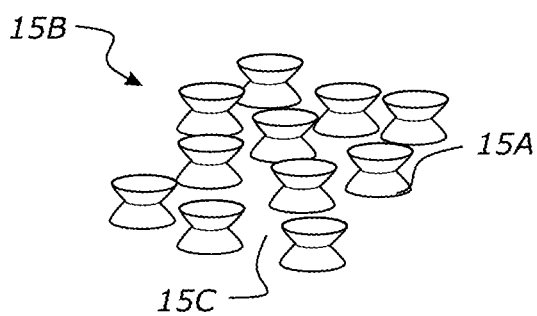

FIG. 5F illustrates an example embodiment of projections 15A, showing projections with a profile comprising a narrowed or thinned or smaller central section or middle. Such projections may have a wider or larger top and base portion. Such a projection may advantageously provide for improved adhesion, for example by allowing adhesive to penetrate or flow into the thinned or narrowed section before curing. Such an example embodiment may provide additional adhered force in an upward and/or sideways direction of motion due to an increase in the amount of adhesive located between projections.

FIG. 5F also illustrates spacing between projections, which could be regions devoid of projection 15C as outlined above.

Figure 5G:
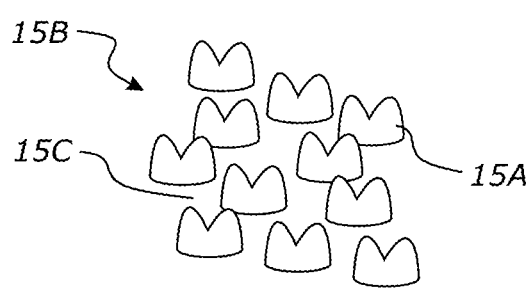

FIG. 5G illustrates an example embodiment of projections 15A, showing projections with a random or distributed spacing, which may advantageously provide for improved adhesion characteristics. FIG. 5G also illustrates increased spacing between projections, which could be regions devoid of projection 15C as outlined above.

Figure 5H:
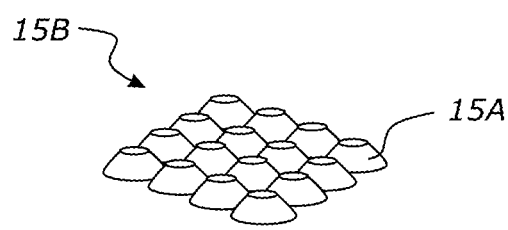

FIG. 5H illustrates an example embodiment of projections 15A, showing projections with a tight or reduced spacing. Such an embodiment may advantageously provide for improved adhesion characteristics, such as by providing an increased surface area of adhesion.

Figure 6A:
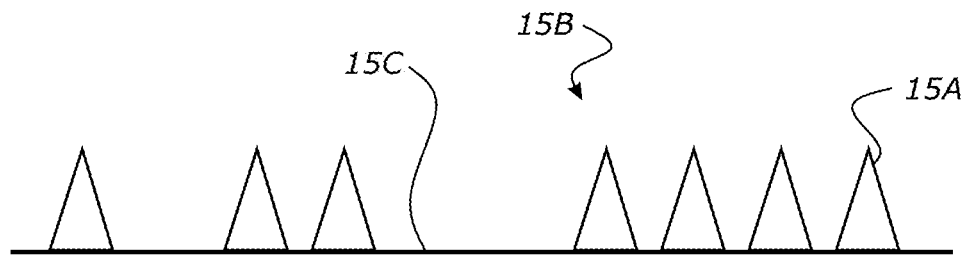
FIGS. 6A-C show illustrative embodiments of cross-sections of fixing projections in a fixing region of an illustrative embodiment of the roofing module.
Figure 6B:
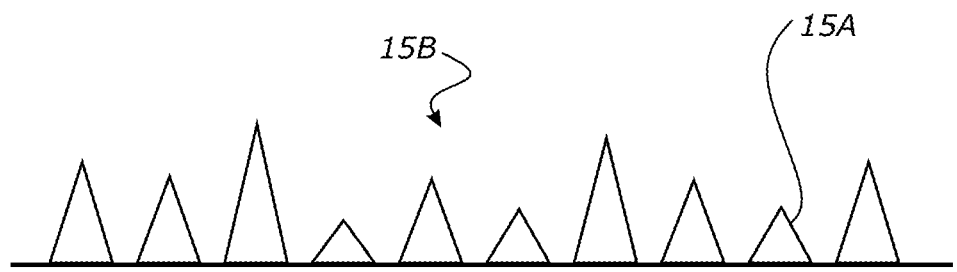
Figure 6C:
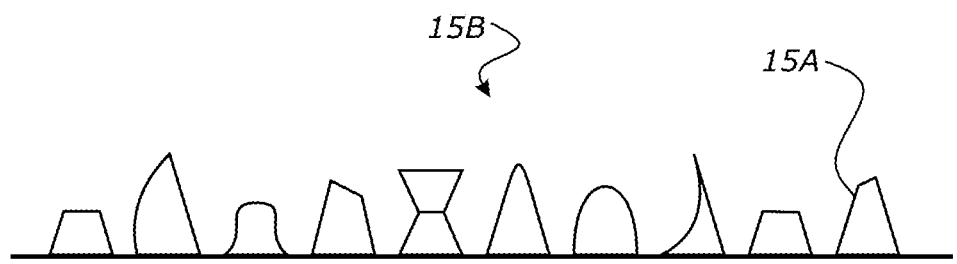

FIGS. 6A-6C illustrate cross-sectional views of a textured region 15 or projection array section 15B.

FIG. 6A illustrates a cross-sectional view of projections 15A, showing projections of uniform projection height and shape, but varying projection spacing. FIG. 6B illustrates a cross-sectional view of projections 15A, showing projections of varying projection height or shape, but uniform projection spacing. FIG. 6C illustrates a cross-sectional view of projections 15A, showing projections of varying projection shape and height.

Any of the above-mentioned example formation or projection embodiments may advantageously provide for improved adhesion characteristics depending on, for example, the type of adhesive used. Any of the formations and adhesives described herein may advantageously be provided to increase or improve a seal (such as a weather-proof or water-tight or water-proof seal) between adjacent modules, and may provide for increased resistance to wind uplift capability of overlapping modules at front and side edges of the modules (for example, increased resistance to uplift or separate of modules to due wind).

In an example embodiment, the formations or projections disposed on the module surface may advantageously be varied in shape, density and/or size according to a characteristic, such as viscosity or bond strength or resistance to heat or UV or other suitable characteristics of an adhesive, such as adhesive 16.

In an example embodiment, a characteristic, such as viscosity or bond strength or resistance to heat or UV or other suitable characteristics of an adhesive may vary depending on environmental conditions, such as temperature and humidity, or bond strength. Accordingly, the formations or projections described herein may advantageously be varied in size, shape and/or density to account for a change in environmental conditions, or accommodate a wider variation in conditions. For example, the size, shape and density of the formations may be varied to advantageously accommodate a wider temperature range that may be encountered by the adhesive during installation, or to accommodate with different adhesives into or with which the formations or projections are to be put into contact therewith.

In an example embodiment the adhesive applied to adhere adjacent modules may be an epoxy or equivalent. Alternatively, example adhesives may include:

Epoxy
Thermoset adhesive
Pressure sensitive adhesive
Hot melt adhesive
Silicone adhesive
Urethane adhesive
SPURs (silane-modified polyurethane)
MS (modified silane adhesive)
Cement adhesive
Asphalt adhesive
SBS modified adhesive Such an adhesive may be applied as a preformed strip onto the module at an adhesive side, with the opposite side being left with a covering strip to prevent air from contacting and curing the adhesive. The covering strip may remain in place until the module is being installed, at which time it is peeled away and discarded, leaving the exposed adhesive to be brought in contact with the textured surface as outlined above.

In an example embodiment, the adhesive may be disposed on both sides of the module to be brought into contact, i.e. on two separate modules, either onto a module surface, or onto a textured region of formations or projections.

In an example embodiment, the adhesive layer may comprise multiple layers of different adhesive on top of each other, advantageously selected for their different properties. Alternatively, or in addition, multiple rows of adhesive may be provided, either as rows of the same adhesive, or different adhesives, advantageously selected for their properties.

In an example embodiment, the different layers or rows of adhesive may advantageously provide different properties, for example a first adhesive disposed on a module surface may provide for a strong or long-term bond strength layer. Additionally, or alternatively, an upper adhesive layer or row may be provided with a high tac or initial bond strength, and for example may provide for different characteristics to a subsequent layer or layers of adhesive.

In an example embodiment, the different layers or rows of adhesive may advantageously provide for different temperature or humidity characteristics, and/or different viscosities, or strength or bonding characteristics In an example embodiment, a top layer of adhesive may be provided with a relatively lower viscosity to allow initial embedment of the textured surface formations or projections. In an example embodiment, subsequent layer(s) of adhesive provide may have relatively higher (or different) viscosity or strength or bonding characteristics.

Figure 8:
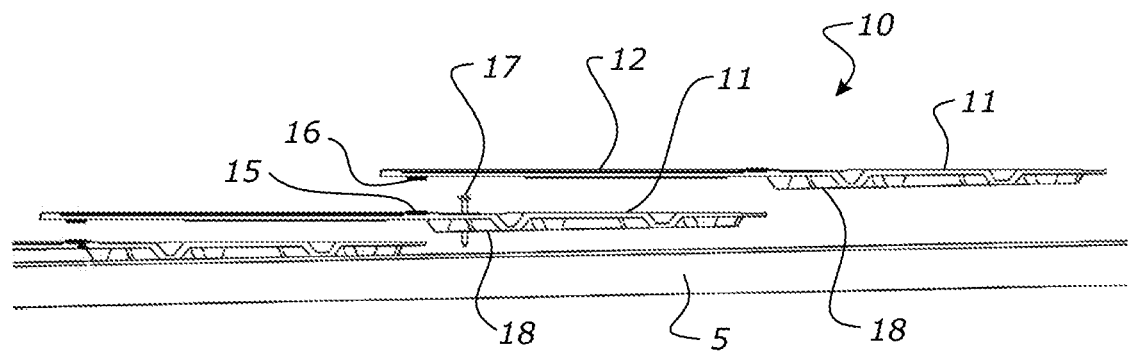
FIG. 8 shows an illustrative side view of a series of overlapping modules being installed upon a building.

FIG. 8 also illustrates a fastener, e.g. nail 17, that can be driven through underlapping region 11 (or, in a further form, both exposed region 12 and underlapping region 11) into a building structure. Alternative fixing arrangements may be made between the modules and building but, according to the invention, adjacent modules are secured together by, at least, an adhesive bond improved by a textured surface.

Figure 8A:
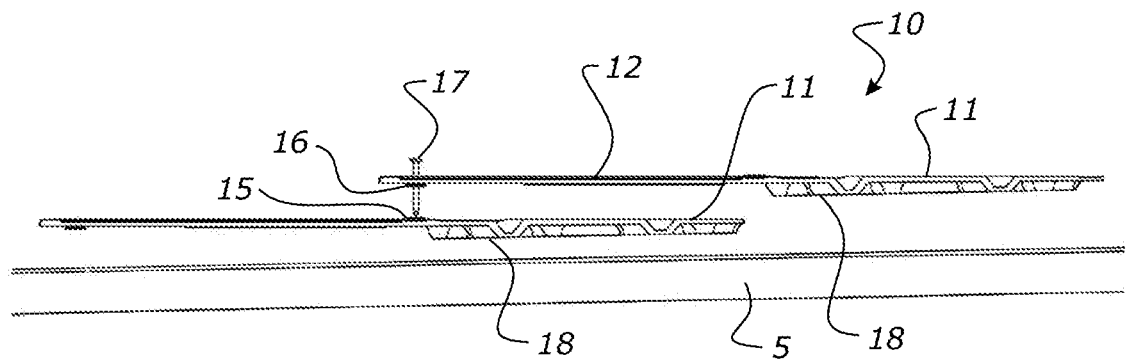
FIG. 8A shows an alternative illustrative side view of a series of overlapping modules being installed upon a building.

FIG. 8A illustrates an alternative example embodiment where a fastened, such as a nail 17, is driven through the underlapping region 11, or both the underlapping region 11 and exposed region 12, through the fixing region 13. In an example embodiment, the fastener 17 may be driven through the adhesive 16 and textured surface region 15, however in alternative embodiments, the fastener 17 may be driven through areas devoid of projections 15C. For example, areas 15C between regions of projections 15A, and/or areas 15C within regions of projections 15 (such as circular region 15C in FIG. 3A).

As outlined above, in alternate forms the textured projection regions 15 may be positioned on the underside of exposed region 12 (i.e. not visible in FIGS. 1 to 3) or both the underside of exposed region 12 and upper side of underlapping region 11.

FIG. 8 illustrates an example embodiment of a first adhesive strip 16 affixed along the lower edge of the module on the back side of the molded material layer, while a textured surface 15 is provided to the top side just below the line of the fixing region. However, FIG. 8 also serves to illustrate the alternative embodiment since the location of adhesive strip 16 can be switched with the textured surface area 15. Alternatively, both regions 15 and 16 could comprise textured surface regions, and/or adhesives.

Further forms of module compatible with the invention may include a series of locator recesses within the fixing region 13 of a molded module 10 for locating nail or screw type fasteners 17. There may be bosses (i.e. thickened sections of material) at the bottom of each recess to provide a strong area for the fastener shank to pass through, and these also create a flat surface 18 to butt with the building surface underneath the module. The sides of the recess may slope outward so that a hammer or pneumatic nail or staple gun can be used to drive the fastener home without damaging the surrounding module material.

There may be "starter" holes or locators within the fixing region 13 for locating fasteners 17 (e.g. nails, staples, or screws) which attach the module to the building surface. These locators can be molded features or extra surface markings. The purpose of such locators is to simplify installation by showing how many fasteners 17 are required and how far apart they ought to be spaced.

There may be a layer of reinforcement material covering the fixing region of the module to prevent the module material from tearing where it is penetrated by the fasteners, in which case the locators can serve to ensure that the fasteners are positioned within the reinforced zone.

Once the module 10 is fixed to the roof the head of the fastener should be flush with or sit below the top of the locator opening. As shown in FIG. 8, this allows the overlapping region of a subsequently affixed module to sit flat over top of the first module.

In some forms the module may be formed with a convex precamber to apply a pre-load pressure to encourage the edges and bottom surface of the overlapping module to contact firmly onto the underlapping module when installed on a building. This also provides high thermal conductivity between the underlapping module and the overlapping module.

Adhesive strips 16 (shown in FIG. 8) running along the length of each module are used to connect one module to the surface of the next, creating a waterproof seal and stopping grit and particulates from working their way under the roofing or cladding layer. The bond and seal is improved by the textured surface 15.

There is also an advantage to securing those regions of the module which are farthest from the fixing region so that the exposed portions of the module cannot flap up in the wind and cause damage through fracture or bending stresses. This may be done with adhesive strips or by other means. When adhesive strips are used, as mentioned, it may be beneficial to have them covered by release (cover) strips for transport and storage. The release strips would be removed during installation.

The placement of the adhesive strip(s) on the module can vary so long as a textured surface region 15 has a corresponding adhesive strip 16 (although additional adhesive strips are possible that do not necessarily have an aligning textured region 15).

As shown in FIG. 8, in one embodiment, a first adhesive strip 16 is affixed along the lower edge of the module on the back side of the moulded material layer, while a collection of small projections 15 are formed in the top side just below the line of the fixing region. Thus a series of modules can be arranged, where the strip 16 on the back side adheres to the region 15 on the front side.

The module may be pre-formed (i.e. during the continuous forming process) with a textured region 15 on the upper surface of the underlapping region that serves as a weather-tight barrier when placed into contact with an adjacent module. Alternatively, a module could be retro-fitted with a textured stamp or otherwise affixed region 15.

The combined/bonded regions 15/16 prevents the back-flow of water or air in between the overlapping modules. A further alternative or addition is to place a similar strip of polymeric material on the lower surface of the exposed region, to prevent water from penetrating between the two overlapping modules.

In one embodiment, a sequence of steps in the manufacture of the roofing and/or cladding product, according to FIG. 9, is to firstly prepare the module material for forming (which may involve bringing layers of the material 19 to a molten, semi-molten or pliable state), secondly, feeding the material 19 to a pressure forming zone 20, and thirdly, forming and setting the material as it advances through the pressure forming zone to produce a module 10.

While there are various methods of mixing and presenting the materials prior to forming, a suitable method is to deposit an extruded feed layer of a first material onto an advancing support surface of a continuous forming machine, and to subsequently introduce a further extruded feed layer of another material overtop of this, as shown in FIG. 9. The first material and the second material or additional may be the same or different, and may be of the same or different form. Both materials then proceed as a layered feed to the pressure forming zone 20, and are moulded into a single module panel 10.

The product can be manufactured so that there are different features on the top of the moulded panel to those on the bottom by using different dies in the upper 21 and lower 22 rotating tracks of a continuous forming machine. The modules can also be manufactured using a single material only.

Upon arrival at the pressure forming zone 20 it may be that the second material feed entirely covers the first, however the feeds may be arranged so that only a portion of the first feed is covered by the second. There may only be a thin strip of the second material or additional material on top of the first or second feed, and the positioning of the strip across the width of the first feed can vary. These variations can be achieved during manufacture by changing the positioning of the various extruders relative to each other and by altering the width of the feeds.

Additional material layers (whether extruded, roll fed, or otherwise presented) can also be added prior to or after the forming process. This allows for the continuous forming of a multi-layered product, each material layer having a particular set of properties which are advantageous to the product. In particular, it may be desirable to add one or more reinforcing layers to the product. Such layers may comprise a metal, cloth or fiberglass mesh, jute or other fabric, glass fiber, carbon fiber, aluminum sheet or a reinforcing polymer. These can be laid beneath, on top of, or in between the other material layers prior to the forming step, and may or may not undergo deformation during the forming step.

The thickness of the module panel 10 produced will be determined in part by the materials selected and the number of layers fed in. In one embodiment the thickness of the panels may be within the range of about 0.5-55 mm.

The various layers of material may chemically bond together prior to or during the forming step, however their ability to do so will depend entirely on the materials selected. Where the materials selected are not prone to chemical bonding, it may be necessary to assist adhesion with a plasma or adhesive layer; or to feed in a supplementary material with a chemical affinity for both of the material layers. This can be applied in-line as an interposing layer or deposit atop the first substrate material feed prior to the introduction of the second. The various layers of material may also mechanically bond together due to the surface finishes or features between the layers. As mentioned, an adhesive strip may be deposited during forming, e.g. in an underside of the exposed layer while a textured finish is applied, via the upper die 21 to the upside of the underlapping region or vis-a-versa.

A similar product can be achieved by the segmental injection moulding of the roofing and/or cladding modules, however such a process has a much slower output capacity. Large areas of product need to be produced for building applications and it is desirable to be able to produce these large surface area products in high production volumes to make the process economical. Moreover, such a process would result in a product containing weld lines and injection moulding points. Weld lines are formed when two or more molten polymer flows meet during the injection molding process. This can occur when a polymer flow splits to go around an interruption (e.g. a post that forms a hole) and then rejoins, or when polymer melt fronts meet, from multiple injection points. This can also occur when molten polymer meets a non-molten polymer. Consequently, a visible weld line is observed and the adhesion/bond in this weld line at the interface is weaker than the balance of the polymer within the product. Injection moulding points are the area of a product where the heated material was fed into the mold cavity. It is also difficult to make a product comprising more than one layer of material using injection moulding, and injection moulding can produce color differences or variations that affect the aesthetics of the final product.

On the other hand, the continuous forming machine can produce approximately 5-60 m of product per minute, which makes it a preferable to use this production method over other processes which could be used to manufacture a 3D polymer product. The continuous forming machine also produces a product that lacks weld lines or injection moulding points, and optionally contains multiple layers of material.

A number of materials are suitable for use in the production of a roofing and/or cladding product by a continuous forming process; however, it is most cost effective to produce the moulded panel from a foamed material (e.g. foamed polycarbonate). Not only does this reduce the amount of raw material required for production, but also results in a lightweight product. This can be advantageous in the retrofitting of roofing or cladding to an existing building. For example, where there is a building with an existing but degraded roof, re-roofing can occur by placing the new lightweight shingle directly over top of the existing shingle (usually asphalt shingle).

The foamed polycarbonate (or alternative substrate material) may be accompanied by one or more additional materials to enhance the properties of the product. A suitable material is Thermoplastic Polyurethane (TPU), which can be fed into the moulding process along with the polycarbonate. Foamed polycarbonate and similar materials are favored in roofing products because they have fire retardant properties, but the addition of a TPU layer improves the performance of the product because the TPU has better durability, physical properties and resistance to environmental wear. In particular, TPU is puncture resistant, tear resistant, and UV resistant, and will retain the aesthetic appeal of the product for a longer period of time compared to polycarbonate alone.

Other materials which may be used include (but are not limited to) polycarbonate (PC), general purpose polystyrene (GPPS), polymethyl methacrylate (PMMA), polyethylene terephthalate (PET), polyester methacrylate (PEM), polypropylene (PP), high impact polystyrene (HIPS), acrylonitrile butadiene styrene (ABS), polyester (PES), polyamides (PA), polyvinyl chloride (PVC), polyurethanes (PU), polyvinylidene chloride (PVDC), polyethylene (PE), polytetrafluoroethylene (PTFE), polyetheretherketone (PEEK) (polyetherketone), polyetherimide (PEI), Polyimide (PI), polylactic acid (PLA), high impact polystyrene, acrylonitrile butadiene styrene (ABS), acrylics, amorphous polymers, high density polyethylene (HDPE), polyethylene terephthalate (PET), low density polyethylene (LDPE), linear low density polyethylene (LLDPE), medium density polyethylene (MDPE), cross linked polyethylene (PEX), Ethylene vinyl acetate (EVA), Ethylene vinyl alcohol (EVOH), thermoplastic elastomer (TPE), thermoplastic polyolefin (TPO), thermoplastic rubber (TPR), polypropylene (PP), Fluorinated ethylene propylene (FEP), Polybutylene terephthalate (PBT), Polyoxymethylene (POM), Polyphenylene oxide (PPO), Polypropylene homopolymer (PP—H) Polypropylene copolymer (PP—C), silicon polymers, styrene-acrylonitrile resin (SAN) and thermoplastic rubber. The materials may be a blend of any or all of these. The materials may also comprise additives to enhance properties such as resistance to fracture, impact, ultraviolet light, and thermal or tensile stresses. Materials which could also be considered in manufacture are various polystyrenes, nylons, acrylics, polyethylene, thermoplastic ethylene, polypropylene and phenolic, and combinations of or containing these. No matter which materials are chosen, the materials must be compatible so that they do not delaminate. If the materials are not compatible, they may still be used; however, a tie or bond layer must be introduced between them. Examples of tie or bond layers include, but are not limited to, ethylene vinyl acetate (EVA), thermoplastic polyolefin (TPO), thermoplastic elastomer (TPE), silicon adhesives, epoxy adhesives, and acrylic adhesives. One of skilled in the art is capable of choosing materials in the appropriate combinations to suit the purposes described herein.

In various embodiments, the roofing module is flame resistant, resistant to tearing (especially at puncture and attachment points), able to be easily and cleanly cut with everyday tools to aid installation, able to endure environmental and UV exposure for over 20 years, able to endure cyclic freezing and thawing without failure, resistant to delamination at temperatures of between −40 and 100 degrees Celsius, impact resistant to a reasonable extent, impenetrable by water even at fixing points, low density, resistant to penetration and abrasion, colorfast, resistant to microbial attack, compatible with adhesives and made of materials which are stable in high humidity and wet conditions and which retain their pliability at high and low temperatures and which do not delaminate. All of these factors come into play when choosing appropriate materials or material combinations for the manufacture of the product. It is also desirable that the material(s) used are non-toxic, or that at least the upper layers of the product are (if a layered product is produced). This avoids the prospect of toxic contamination in the event that water is to be collected from one or more building surfaces for subsequent use.

In some embodiments, the product may be produced from a recyclable material or several different recyclable materials. The combination of materials chosen in the manufacture of the product is suitably one that can be recycled without first having to dismantle the product into its constituent materials.

It is also important to choose a material with a low co-efficient of thermal expansion to avoid warping along the length of the product. If the material undergoes too much movement once attached to the building surface it may fail at or between the attachment points. Failure can also be a problem if a layered product is produced with two or more materials having vastly different thermal expansion co-efficients.

In one embodiment, thermal expansion and contraction can be accommodated by moulding each module to have one or more concertina-shaped features that will expand or contract between two fixing points.

In various embodiments, the roofing or cladding module may incorporate additional properties or functionalities, including but not limited to: a photovoltaic functionality; and/or (iii) interconnection functionalities of photovoltaic areas, as described in further detail below.

Module profiles may have chamfered sides or other features of shape to prevent water from gravity pooling in the depressions when the underlying surface on which the product is installed is an angled surface (for example a roof). A series of fine ribs molded on the underside of the module, or roughened surface texture, could alternatively or additionally be used to create turbulence in the air flow. This will also create more surface area for conductive heat transfer from the module.

In some embodiments, the geometry of the ribs or texturing can be chosen to assist in heat transfer. For example, if the texture is, in profile, a series of triangular peaks, this will allow more efficient heat transfer to the passing air flow than if the texture is, in profile, a series of square toothed projections.

As a further option, the surfaces which come into contact when lapping could have complementary texturing on them to assist their inter-engagement.

A thermally conductive paste or adhesive may additionally or alternatively be applied between the contact surfaces to enhance this, or the adhesive strip feature 16 may be thermally conductive or have a thermally conductive component.

In one embodiment, the upper and lower surfaces of the under and overlapping modules respectively have a serrated profile capable of interlocking when the modules are in position. The serrations can be shaped so that they "wedge" into each other and exert some degree of compressive force against one another.

The surface textures might otherwise be splines, knurls, teeth or undulations of another type. The texturing brings the surfaces into better contact so that there is more surface area to facilitate heat transfer between the lapping modules, and could also be used to aid in locating the modules when they are installed on a building surface.

Although foamed materials reduce the cost and weight of the product, the air inside the foam acts as a heat insulator. This can be advantageous if you want to stop heat from the sun being transferred into the ceiling cavity of the building, but it is not ideal for heat transfer in an energy recovery system. Therefore, the thermal embodiment of the roofing and/or cladding product may be adapted to increase its heat transfer capacity.

In order to achieve a foamed material with high heat conductivity, thermally conductive particles (e.g. aluminium flakes) can be introduced into a polymer prior to the forming process. The particles help to create a heat pathway through the material and increase the overall thermal conductivity significantly. The particles may also provide structural reinforcement to the material.

For example, where a module moulded from polycarbonate may have a thermal conductivity of 21 W/mK, the same module moulded from a loaded polycarbonate blend having 30% aluminium will have a thermal conductivity of 25 W/mK. A module moulded from 3% foamed polycarbonate may have an even lower thermal conductivity of 18 W/mK, but this can be improved to 24 W/mK with the addition of 30% aluminium. The module material can be loaded with the thermally conductive substance prior to the manufacture of the module.

In order to prevent the final product from being too brittle, a compatiblising polymer, such as an ionomer, can be blended with the metal particles changing them from a reactive contaminant to a reinforcement agent with elevated levels of thermal conductivity. It is desirable to have some degree of elasticity to the formed material for use in building product applications.

A BIPV system may incorporate one or more "dummy" cells at various locations across the surface of the roof, however, the general configuration incorporating a textured surface region for improved bonding is still preferable. In a suitable embodiment, the dummy cells will look identical to the rest of the PV cells but will have no functionality.

The modules may be suitably joined by an overlapping module (for weatherproofing) or an adhesive pad which extends across the join and contacts the underside surfaces of both modules. It may also be necessary to add a similar adhesive pad to the top side surfaces, or to smear the reverse side of the joining cell with an adhesive paste to secure the join.

Once the module has been formed PV cells can be deposited on top in such a way as to be located by the relief features on the upper surface. PV cells may be fed onto the substrate from a continuous roll feed during forming.

An optional step is to apply a transparent laminate to protect the cells. It is convenient to pre-form (also by continuous moulding) and apply the laminate in-line so that the addition of this layer can occur without any increase in the overall production cycle time. This can be laminated with some degree of electrostatic or adhesive binding to increase adhesion.

While a variety of materials may be suitable as the laminate, a suitable material is fluoropolymer.

Ethylene tetrafluoroethylene (ETFE) is an example of an appropriate fluoropolymer, but other polymers able to remain optically transparent may also be used. The fluoropolymer creates an essentially "self cleaning" top surface so that performance of the PV cells is not inhibited by deposits of dirt and debris. Fluoropolymer is also very stable in ultraviolet light and usually retains its light transmitting capacity for longer than glass, which is another commonly used material in PV applications.

It is advantageous to choose a material which would be able to maintain light transmission during long periods (approximately 10-25 years) of environmental exposure. The laminate is applied to cover parts of the panel which are not directly exposed to light but which will receive reflected light. This laminate also gives superior durability to the exposed outer area of the panel and may be used even without PV cells to provide greater long-term durability.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 units refers to groups having 1, 2, or 3 units. Similarly, a group having 1-5 units refers to groups having 1, 2, 3, 4, or 5 units, and so forth.

All references cited herein are incorporated by reference in their entireties and for all purposes to the same extent as if each individual publication, patent, or patent application was specifically and individually incorporated by reference in its entirety for all purposes.

The invention claimed is:

1. A roofing, cladding, or siding module comprising:
an underlapping region and an exposed region, wherein the underlapping region is adapted to be at least partially covered by an exposed region of at least one adjacent module to be overlaid thereon;
wherein:
an upper surface of the underlapping region comprises one or a plurality of textured surface region(s) providing for a preformed textured surface, the textured surface region(s) to be in use, presented for contact with an adhesive region provided upon one or more of the adjacent module(s), the adhesive region provided on the underside of the exposed region of the adjacent module, to face and substantially align with the one or plurality of textured surface regions of the module, and the underside of the exposed region comprises a non-textured surface configured to receive an adhesive to form the adhesive region, the textured surface region(s) is/are a surface area or areas comprising a plurality of formations, the plurality of formations provided of the same material of the upper surface of the underlapping region, and each formation of the plurality of formations extends as a protrusion of the upper surface of the underlapping region, or
an underside of the exposed region comprises one or a plurality of textured surface region(s) providing for a preformed textured surface, the textured surface region(s) to be in use, presented for contact with an adhesive region provided upon one or more of the adjacent module(s), the adhesive region provided on the upper surface of the underlapping region of the adjacent module, to face and substantially align with the one or plurality of textured surface regions of the module, and the upper surface of the underlapping region comprises a non-textured surface configured to receive an adhesive to form the adhesive region, the textured surface region(s) is/are a surface area or areas comprising a plurality of formations, the plurality of formations provided of the same material of the underside of the exposed region, and each formation of the plurality of formations extends as a protrusion of the underside of the exposed region.

2. The module of claim 1, wherein the textured surface region comprises an adhesive.

3. The module of claim 1, wherein the adhesive region of an adjacent module is substantially planar, or the surface of the adjacent module comprising the adhesive region is substantially planar.

4. The module of claim 1, wherein the adhesive or adhesive region includes a peel or release sheet covering an adhesive.

5. The module of claim 4, wherein removal of the peel or release sheet exposes the adhesive.

6. The module of claim 1, wherein the adhesive region is provided over a predetermined or pre-defined area, the area located at a leading edge of the underlapping region or at a leading edge of an underside of the exposed region.

7. The module of claim 1, wherein the protrusion(s) is/are of one or more of the following:
i. the same or different or dissimilar heights from the textured surface region,
ii. the same or different or dissimilar geometry of shape with respect to other protrusions,
iii. of a regular or irregular geometry,
iv. are equally or unequally spaced from each other,
v. are of the same or different or dissimilar rigidity or flexibility with respect to each other or with respect to a surface of the module or the adjacent module surface to which the protrusions are to be brought toward engagement therewith,
vi. are of the same or different or dissimilar density,
vii. a grouping of a plurality of the protrusions comprising a plurality of protrusions of any one of i)-vi).

8. The module of claim 1, wherein the formations is/are provided to be of a predetermined spacing or density so as to:
i. provide for a spacing for the adhesive to displace into; and/or
ii. provide for a spacing for alignment or to accept or match up with a cut-out in an adjacent module being overlaid thereon.

9. The module of claim 1, wherein the protrusion is shaped so as to be: peaked, spiked, conical, cylindrical, pyramidal, square, pentahedron, flat top pentahedron, pentagonal, hexagonal, or hourglass.

10. The module of claim 1, wherein the protrusion comprises a distal end portion, the distal end portion being spaced most from the surface from which the formation extends, the distal end portion being of a sharp or peak or spike form.

11. The module of claim 1, wherein an array or plurality of arrays of formations is provided upon the surface of the module or the adjacent module.

12. The module of claim 11, wherein the array or each array is a pattern, arranged geometrically.

13. The module of claim 11, wherein the array or each array is a serially sequenced pattern of a grouping of formations.

14. The module of claim 11, wherein the array or each array is separately provided for by a forming tool of a continuous forming machine.

15. The module of claim 1, wherein the protrusions are substantially 0.05 mm to substantially 2 mm in height.

16. The module of claim 1, wherein a distal end portion of each protrusion comprises a peak, and wherein the peaks of the protrusions are spaced apart by substantially 0.5 mm to substantially 10 mm.

17. The module of claim 1, wherein the textured surface area is elongate, located at a leading edge of the exposed region or underlapping region.

18. The module of claim 17, wherein the elongate textured surface area is continuous or discontinuous.

19. The module of claim 1, further comprising a fixing area, for receiving fasteners therethrough.

20. The module of claim 19, wherein the fixing area coincides with or is proximate to the textured surface area.

21. The module of claim 19, wherein the fixing area is located upon the underlapping region, proximate a transition between the underlapping region and exposed region of the same module.

22. The module of claim 19, wherein the fixing area is a reinforced part of the underlapping region.

23. The module of claim 1, wherein the module is configured with the exposed region at a leading edge, the underlapping region at a trailing edge of the exposed region and the textured surface area positioned on or adjacent the upper surface of the leading edge of the underlapping region, being proximate a trailing edge of the exposed region.

24. The module of claim 1, wherein the module is configured with the exposed region at a leading edge, the underlapping region at a trailing edge of the exposed region and the textured surface area positioned on or adjacent the underside surface of the leading edge of the exposed region.

25. A roofing system comprising
a first module comprising a first underlapping region and a first exposed region, and
a second module comprising a second underlapping region and a second exposed region,
wherein the first underlapping region is adapted to be at least partially covered by the second exposed region of the second module when the second module is overlaid on the first module;
wherein:
an upper surface of the first underlapping region; comprises one or a plurality of textured surface region(s) providing for a preformed textured surface, the textured surface region(s) to be, in use, presented for contact with an adhesive region provided upon the first and/or second module, the adhesive region provided on the underside of the second exposed region, to face and substantially align with the one or plurality of textured surface regions, and the underside of the second exposed region comprises a non-textured surface configured to receive an adhesive to form the adhesive region, the textured surface region(s) is/are a surface area or areas comprising a plurality of formations, the plurality of formations provided of the same material of the upper surface of the first underlapping region, and each formation of the plurality of formations extends as a protrusion of the upper surface of the first underlapping region, or
an underside of the second exposed region comprises one or a plurality of textured surface region(s) providing for a preformed textured surface, the textured surface region(s) to be, in use, presented for contact with an adhesive region provided upon the first and/or second module, the adhesive region provided on the upper surface of the first underlapping region, to face and substantially align with the one or plurality of textured surface regions, and the upper surface of the first underlapping region comprises a non-textured surface configured to receive an adhesive to form the adhesive region, the textured surface region(s) is/are a surface area or areas comprising a plurality of formations, the plurality of formations provided of the same material of the underside of the exposed region, and each formation of the plurality of formations extends as a protrusion of the underside of the second exposed region.

* * * * *